United States Patent
Hall et al.

(10) Patent No.: US 11,486,753 B2
(45) Date of Patent: Nov. 1, 2022

(54) TOILET WITH EXCRETA VOLUME PRESSURE SENSOR

(71) Applicant: Medic, Inc., Provo, UT (US)

(72) Inventors: David R. Hall, Provo, UT (US); Travis Niederhauser, Mapleton, UT (US); Jared Reynolds, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 225 days.

(21) Appl. No.: 16/884,598

(22) Filed: May 27, 2020

(65) Prior Publication Data

US 2020/0393284 A1    Dec. 17, 2020

Related U.S. Application Data

(60) Provisional application No. 62/888,965, filed on Aug. 19, 2019, provisional application No. 62/862,399, filed on Jun. 17, 2019, provisional application No. 62/862,618, filed on Jun. 17, 2019.

(51) Int. Cl.
*G01F 22/02*    (2006.01)
*E03D 9/00*    (2006.01)

(52) U.S. Cl.
CPC ............... *G01F 22/02* (2013.01); *E03D 9/00* (2013.01)

(58) Field of Classification Search
None
See application file for complete search history.

(56) References Cited

U.S. PATENT DOCUMENTS

| | | | |
|---|---|---|---|
| 4,554,687 A * | 11/1985 | Carter | A61B 5/208 4/144.1 |
| 2005/0132482 A1 * | 6/2005 | Butsch | E03D 11/00 4/325 |
| 2011/0265576 A1 * | 11/2011 | Cha | G01F 1/007 73/700 |
| 2017/0191859 A1 * | 7/2017 | Hall | G01F 23/24 |
| 2019/0343444 A1 * | 11/2019 | Yabuki | A61B 10/007 |

\* cited by examiner

*Primary Examiner* — Peter J Macchiarolo
*Assistant Examiner* — Jermaine L Jenkins

(57) ABSTRACT

A toilet for measuring excreta is disclosed. The toilet is adapted to measure the amount of excreta received by the bowl and then the flush water. A pressure sensor is configured to monitor the pressure exerted by the flush water and any excreta contained therein. Data from monitoring the pressure of the flush water and excreta therein is used to determine the weight or volume of the excreta received by the bowl. This toilet can provide data which may be used to analyze how the volume of flush water changed due to excreta deposit. A volume change feature can be associated with a urination event and the data associated with the event can be used to determine a urine characteristic of the event.

18 Claims, 20 Drawing Sheets

TOILET WITH EXCRETA VOLUME PRESSURE SENSOR

CROSS-REFERENCE TO RELATED APPLICATIONS

This application claims priority to U.S. Provisional Patent Application Nos. 62/862,399 titled "Toilet for Measuring Volume and Rate with a Pressure Sensor" filed on 17 Jun. 2019; 62/862,542 titled "Toilet Configured to Distinguish Excreta Type and Determine Volume" filed on 17 Jun. 2019; 62/862,618 titled "Toilet with Controlled Bowl Fill Level for Uroflow Measurement" also filed on 17 Jun. 2019; and 62/888,965 titled "Toilet with Precise Fill Level" also filed on 19 Aug. 2019, all of which are incorporated herein by reference in their entirety.

TECHNICAL FIELD

The present disclosure relates to toilets. More particularly, it relates to analytical toilets equipped to provide health and wellness information to the user.

BACKGROUND

The ability to track an individual's health and wellness is currently limited due to the lack of available data related to personal health. Many diagnostic tools are based on examination and testing of excreta, but the high cost of frequent doctor's visits and/or scans make these options available only on a very limited and infrequent basis. Thus, they are not widely available to people interested in tracking their own personal wellbeing.

Toilets present a fertile environment for locating a variety of useful sensors to detect, analyze, and track trends for multiple health conditions. Locating sensors in such a location allows for passive observation and tracking on a regular basis of daily visits without the necessity of visiting a medical clinic for collection of samples and data. Monitoring trends over time of health conditions supports continual wellness monitoring and maintenance rather than waiting for symptoms to appear and become severe enough to motivate a person to seek care. At that point, preventative care may be eliminated as an option leaving only more intrusive and potentially less effective curative treatments. An ounce of prevention is worth a pound of cure.

Just a few examples of smart toilets and other bathroom devices can be seen in the following U.S. patents and Published Applications: U.S. Pat. No. 9,867,513, entitled "Medical Toilet With User Authentication"; U.S. Pat. No. 10,123,784, entitled "In Situ Specimen Collection Receptacle In A Toilet And Being In Communication With A Spectral Analyzer"; U.S. Pat. No. 10,273,674, entitled "Toilet Bowl For Separating Fecal Matter And Urine For Collection And Analysis"; US 2016/0000378, entitled "Human Health Property Monitoring System"; US 2018/0020984, entitled "Method Of Monitoring Health While Using A Toilet"; US 2018/0055488, entitled "Toilet Volatile Organic Compound Analysis System For Urine"; US 2018/0078191, entitled "Medical Toilet For Collecting And Analyzing Multiple Metrics"; US 2018/0140284, entitled "Medical Toilet With User Customized Health Metric Validation System"; US 2018/0165417, entitled "Bathroom Telemedicine Station"; U.S. Pat. No. 9,939,307, entitled "Optical Proximity Sensor Based Toilet With Fill Tube Proximity Level Sensing"; and U.S. Pat. No. 9,927,302, entitled "In-toilet Apparatus For Discrimination Of Urine and Feces." The disclosures of all these patents and applications are incorporated by reference in their entireties.

SUMMARY

In a first aspect, the disclosure provides a toilet adapted to measure the amount of excreta received by the bowl and then the flush water. A pressure sensor is configured to monitor the pressure exerted by the flush water and any excreta contained therein. Data from monitoring the pressure of the flush water and excreta therein is used to determine the weight or volume of the excreta received by the bowl.

In a second aspect, the disclosure provides a method for determining a urine characteristic from an excreta event. The method includes providing a toilet comprising a bowl and flush water adapted to receive excreta and a pressure sensor configured to monitor the pressure exerted by the flush water and any excrete therein. Additionally, the method includes monitoring the volume of flush water during a period of time that overlaps with an excreta event, analyzing how the volume of flush water changes as a result of excreta being deposited into the bowl, and identifying a volume change feature of the data from the monitoring that corresponds with a urination event. Finally, the method includes using the volume change feature and characteristic from the expert event.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

Regarding figures of graphs or plots of data, it should be understood that there are limitations inherent to the format. While efforts are made for the figures to accurately reflect what is described in the body of the disclosure, some features of the figures are approximations, including data point locations and the paths of fit or trend lines.

DETAILED DESCRIPTION

Figure 1:
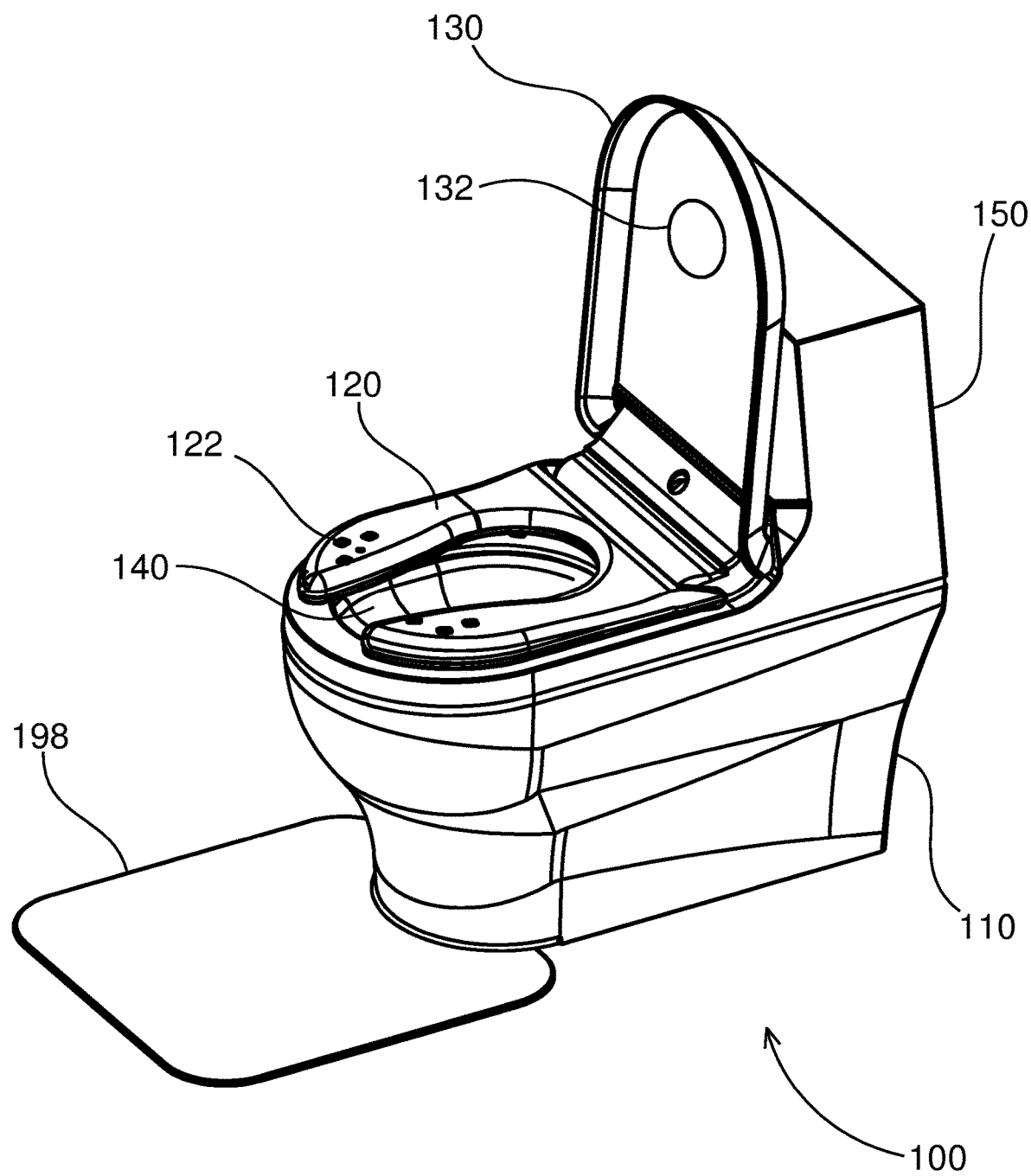
FIG. 1 is an isometric view showing an exemplary embodiment of a toilet according to the present disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "toilet" is meant to refer to any device or system for receiving human excreta, including urinals.

As used herein, the term "bowl" refers to the portion of a toilet that is designed to receive excreta.

As used herein, the term "base" refers to the portion of the toilet below and around the bowl supporting it.

As used herein, the term "user" refers to any individual who interacts with the toilet and deposits excreta therein.

As used herein, the term "excreta" refers to any substance released from the body of a user, including urine, feces, menstrual discharge, saliva, expectorate, sputum, and anything contained or excreted therewith.

As used herein, the term "excretion profile" is meant to refer collectively to the rate of excretion at any moment in time of an excretion event and the total volume or mass of excreta as a function of time during an excretion event. The terms "defecation profile" and "urination profile" refer more specifically to the separate measurement of excreta from the anus and urethra, respectively.

As used herein, "fecal event" or "defecation" and similar terms are generally interchangeable and are meant to refer to excretion from the rectum.

As used herein, "urinary event" or "urination" and the similar terms are generally interchangeable and are meant to refer to excretion from the urethra.

As used herein, the term "sensor" is meant to refer to any device for detecting and/or measuring a property of a person or substance regardless of how that property is detected or measured, including the absence of a target molecule or characteristic.

As used herein, the term "data connection" and similar terms are meant to refer to any wired or wireless means of transmitting analog or digital data and a data connection may refer to a connection within a toilet system or with devices outside the toilet.

As used herein, the term "pressure sensor" is meant to refer to a device for pressure measurement of liquids. Pressure is an expression of the force required to stop a fluid from expanding; it is usually stated in terms of force per unit area. Such a pressure sensor usually acts as a transducer because it generates a signal as a function of the pressure imposed.

As used herein, the term "proximity sensor" is meant to refer to a sensor able to detect the presence of nearby objects without any physical contact. A specific object being sensed is often referred to as the proximity sensor's target. A proximity sensor often emits an electromagnetic field or a beam of electromagnetic radiation (infrared, for instance), and looks for changes in the field or return signal. In some cases, these changes are used to determine how far the target is from the proximity sensor.

As used herein, the terms "weight sensor" and "load cell" are intended to have a relatively broad meaning, referring to a transducer, specifically a force transducer that converts a force such as tension, compression, pressure, or torque into an electrical signal that can be measured and standardized. As the force applied to the weight sensor or load cell increases, the electrical signal changes proportionally.

As used herein, "flush water" is meant to refer to standing water in the toilet, along with any excreta contained therein, which can be removed from the toilet to facilitate removing excreta from the toilet. Flush water may also contain other matter received by the bowl, including toilet paper, cleaning or sterilizing agents, and reagents. Flush water is not intended to refer to water or other liquids added to the bowl or other components during excreta removal or cleansing.

As used herein and when use in the context of signal processing, the term "filter" and its derivatives are meant to refer to processing of a signal with the potential to change all or portions of the signal. For example, a high pass filter filters an electric signal such that higher frequencies are allowed to remain in the signal while frequencies below a cutoff frequency are not allowed to remain in the signal. Alternatively, a low pass filter will filter an electric signal such that lower frequencies are allowed to remain in the signal while frequencies above a cutoff frequency are not allowed to remain in the signal. There are many other types of filters used for signal processing which are helpful for many different goals; these filters can affect many characteristics of a signal. For example, a filter acting on an electric signal can affect, among other properties of the signal, the frequency(ies), wavelength(s), voltage, power, and/or amplitude.

This disclosure includes reference to the "derivative" of a data set. Broadly defined, a derivative is the ratio of the change in one variable (generally a dependent variable such as intensity (I) or volume (V)) to the change in another variable (generally an independent variable such as distance (D) or time (T) upon which the dependent variable depends). It is generally determined based on consecutive values of the independent variable. One example is the change in the V divided by the change in the T. If data were presented as points represented in the form (T,V), the data points (1,3) and (2,7) would have a derivative of 4 because (7−3)/(2−1)=4. In this example, the data points would represent the volume at two different times and the derivative is how much the volume changed between those times.

When working with real-time sensor data, there are likely to be erratic and/or unrelated increases and decreases in the measured value as time advances, which are often collectively referred to as "noise." Various processes can be applied to average, remove, or otherwise distinguish the noise from the desired data. These processes can be applied regardless of whether the noise amplitude is large or small. If there is high amplitude noise, uncertainty in the measurements will be high. For example, when the noise amplitude is high and more aggressive filters are applied, they might mask desired features in the data. In general, the smaller the amplitude of the noise is with respect to the amplitude of the signal of interest being measured, the more precisely the signal can be measured. In general, the larger the amplitude of the noise is with respect to the amplitude of the signal of interest being measured, the higher the uncertainty of the resulting measurement will be large. Continuing with the time-volume (T-V) example above, there may not be a significant change to the volume. But the sensor may report small changes in the volume between consecutive data points and, especially when using a data sampling rate under 1 time unit (e.g., a time unit of 1 second and a sampling rate of 20 milliseconds), can cause the derivative to significantly multiply. But, if the noise has a local average of 0, this can be used to determine that the relevant derivative for this period of time was also 0.

One common analysis of data sets, especially when there is noise, is to determine how the data is trending, be it in the positive, negative, or 'no change' direction. Such trending is a useful summary of the data that can facilitate further assessment of the data. There are many different approaches known to statisticians and others similarly competent in data set assessment. Again, continuing with the time-volume example from above, 1000 volume data points (in mL) from a 5 second (s) period of time may result in noise with positive and negative jumps with corresponding derivatives in the range of positive and negative 20-40 mL/s. But when the noise is averaged for the time period, the data may show an average derivative or increase of fluid of approximately 1 mL/s during the 5 second period.

During an excreta event, the volume of flush water is unlikely to have a constant derivative. There are many ways to get a more accurate depiction of the derivative. A simple type of approach would be to use a rolling average of 15 consecutive data points. While there are many ways to implement this, the general concept is to use the average of 15 consecutive data points rather than an individual data point. Continuing to use the example from above, one example implementation is as follows, the volume from the 135th data point could be represented by an average of the sensor data from the 130th-145th data points, the 136th by the average from the 131st-146th, the 137th by the average from the 132nd-147th, and so forth applied to nearly all of the 1000 data points. Then, these average volumes could be used to determine the derivative between consecutive data points. This is just one of many approaches to process sensor data that are known to one skilled in the art. Some approaches are different versions of the rolling average approach and may vary any number of factors, including the number of data point grouped together, the distance between data points, the number of data points preceding and/or following the chosen data point, and whether the average is of the raw data or following an algorithmic or other processing of the signal. Other approaches use software and/or hardware and include many approaches that are more complex or specialized for specific goals.

As used herein, "Butterworth filter" is meant to refer to a signal processing filter designed to have a frequency response as flat as possible in the bandpass. The bandpass is a range of frequencies or wavelengths that can pass through a filter.

Exemplary Embodiments

The present disclosure relates to a toilet that receives excreta from a user and includes instrumentation capable of determining one or more property of the excreta related to excreta's volume or flow rate and also of differentiating between types of excreta. One benefit of the present invention is being able to easily monitor a person's excreta event with the convenience of using the toilet (as opposed to taking a sample or using specialized equipment not commonly available in a restroom or lavatory.

Figure 2:
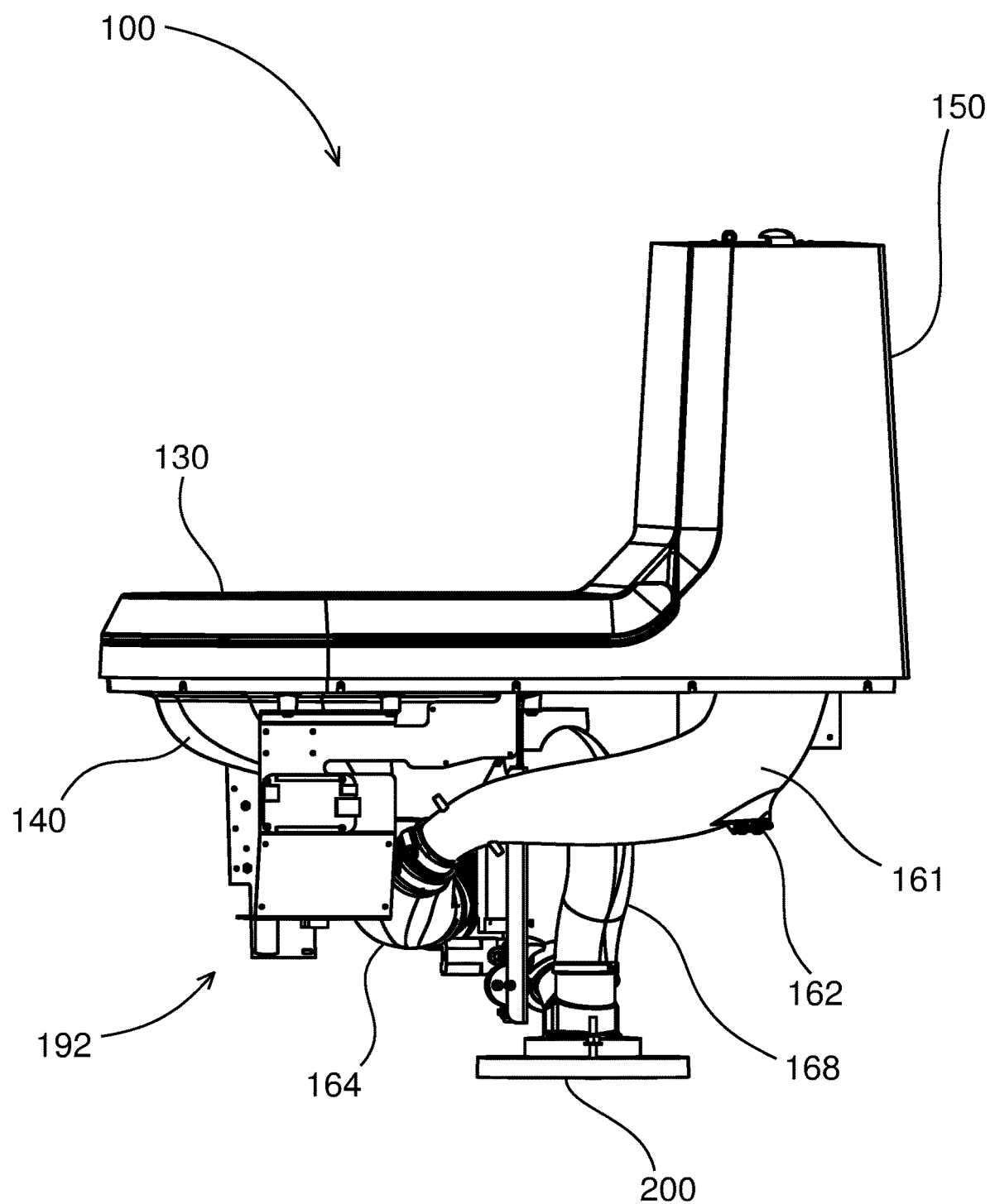
FIG. 2 is a side view illustrating interior components of the toilet according to the embodiment of FIG. 1.
Figure 3:
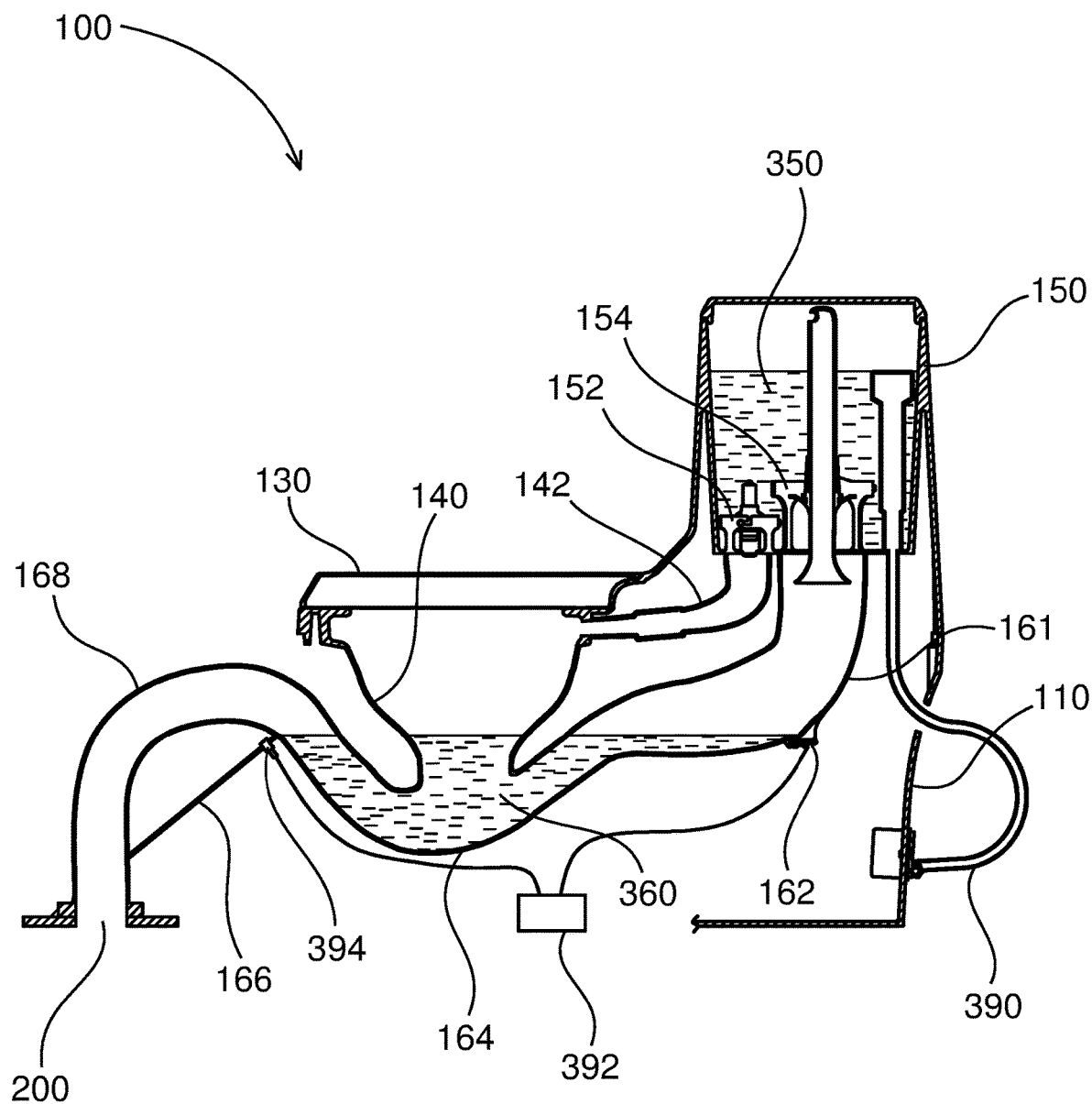
FIG. 3 is a diagram illustrating interior components of the toilet according to the embodiment of FIG. 1.

Now referring to FIGS. 1-3, one embodiment of a toilet is shown. FIG. 1 is an isometric view of toilet 100 with tank 150 and with lid 130 up, exposing seat 120 and bowl 140. Additionally, it shows footpad 198 in front of the toilet, which may include a scale, ECG leads, or other desired components. Toilet 100 includes shroud 110. Seat 120 shows sensors 122. Lid 130 includes sensor 132, which may be an acoustic sensor, electric lead, or other relevant sensor.

FIG. 2 shows toilet 100 with shroud 110 and other components removed to show some of the interior components of toilet 100. Lid 130 is shown down. Additionally, a central connector 164 fluidly connects bowl 140 with connector flush tube 161 and p-trap drain tube 168. Connector flush tube 161 contains flush water sensor 162 which is configured to monitor the flush water and provide data that can be used to determine volume characteristics of the flush water, such as volume, volume change, and/or the time-relative status of properties. P-trap 168 provides a fluid connection from central connector 164 to drain 200. Drain 200 can be connected to any number of things, including a sewer drain, septic system, recycling system which process the flush water for reuse, septic tank, or other container for receiving and storing excreta and flush water.

The figure includes a reference to additional hardware 192, which can include a variety of instruments, processors, and/or other electronic hardware required for the function of the toilet. In one preferred embodiment, additional hardware 192 includes a spectrometer, a computer processor, computer memory, one or more electric signal processor, a power supply or adapter, data transmission and reception. Other embodiments may only include a smaller subset of these components and/or may include additional items to facilitate the functions of the toilet, including data collection, data processing, and/or data transfer. Any of these or other components that support the functions of the toilet may be housed within the tank, including components that facilitate flushing the toilet and providing for a specific amount or level of flush water in the toilet.

FIG. 3 is a diagram showing fluid handling areas within toilet 100; it has been flattened to a 2-dimensional image from its preferred 3-dimensional configuration for ease of understanding and may not accurately depict contouring, sizing, or location for all embodiments. Flush water 360 generally resides in toilet 100 and is in contact with bowl 140, central connector 164, connector flush tube 161, p-trap 168, and potentially with volume control drain 166 and drain control 394. Excreta can be deposited into bowl 140 of toilet 100 and then received by flush water 360. When the toilet is flushed, tank water 350 exits tank 150 through rim flush valve 152 into rim flush tube 142 to flush excreta and other material from bowl 140 into central connector 164. Also, as part of the flush, tank water 350 flows through connector flush valve 154 into connector flush tube 161 toward central connector 164. Tank water 350 then flows through central connector 164 and p-trap 168 into drain 200, carrying with it flush water 360, which can include excreta and other free moving materials contained therein. Following a flush, tank 150 is filled with a new supply of tank water 350 from water supply connection 390. Any or all of the valves may be manually controlled, electronically controlled, or any combination of the two.

Flush water sensor 162 monitors a property of flush water 360 related to the volume of the flush water, such as the pressure exerted by flush water 360 or the height of flush water 360. The signal from flush water sensor 162 can change as excreta is received by the flush water. If flush water 360 has risen to its maximum and/or begun overflowing through p-trap 168 to drain 200, the addition of excreta may not change the flush water sensor output signal. Based on the sensor chosen, the signal may also change for unrelated reasons, including flushing of the toilet, non-excreta being receive by flush water 360, or air pressure changes near the surface of the flush water.

Continuing with the embodiment in FIG. 3, the signal from the flush water sensor can be used to determine if a predetermined or desired amount of flush water is in the toilet. Based on that determination water can be added to the flush water to increase the amount of flush water. Alternatively, a portion of the flush water may be removed to decrease the amount of flush water. Water may be added through connector flush valve 154. Alternatively, a different mechanism, such as another valve or a pump, may be used to add water to the flush water. A portion of the flush water may be removed by processor 392 sending a signal to open drain control 394 so flush water can flow through volume control drain 166; in one preferred embodiment, processor 392 is part of additional hardware 192. In one preferred embodiment, the position of the opening of volume control drain 166 to the flush water is such that it will not drain below the minimum desired height of the flush water. Alternatively, the position of the opening of volume control drain 166 to the flush water is below the desired flush water height. Alternatively, a portion of the flush water may be pumped out to the drain or removed to another location other than the drain. In another alternative embodiment, a single orifice providing access to the flush water may be used to add water and/or removed flush water from the flush water. There are a variety of configurations that could implement such a single orifice, including a bidirectional pump and/or valving. Alternatively, the geometry of the structure holding the flush water may be modified to change the volume read by the flush water sensor without changing the actual volume of flush water present in the toilet. Additionally, the geometry of the flush pathway also affects flush efficiency.

The various parts of the toilet can be made from many materials. There are many different considerations that can influence the material choice and other elements of the design of these parts, including the overall application, cost, wear conditions in or around the toilet, required maintenance, structural requirements, aesthetics and other elements of industrial design, comfort of use, ease of installation, physical space, functions and features of the toilet, safety, sanitation, and cleaning. In one preferred embodiment, many of the functions related to water in the toilet are automated and controlled by a processor, with electromechanical valves connected to and operated by the processor.

One common material of construction for significant portions of toilets is ceramic. One reason a toilet has some of this material is for the structural support of the toilet and a user seated thereon. By switching to an internal-frame supported toilet, components such as the tank, bowl, and piping can more easily be made from other materials. These other materials also facilitate the integration of more complex geometries as well as the addition of sensors and other electronics.

In one preferred embodiment, the toilet shroud is plastic. In alternative embodiments, the shroud can be made from other materials that meet the needs of the application and the above described considerations, including cost, manufacturability, structural design, industrial design, environment conditions, and ease of installation. In one preferred embodiment, other exterior components are designed to visually match or complement the shroud, including the lid, seat, tank, tank lid, and bowl. These components can thus be made of the same material as the shroud or one that can be made to look visually similar. Other important considerations in material choice are discussed above.

In one preferred embodiment, the area that contains the flush water is complex and serves many purposes, including catching excreta and hygiene elements, being cleaned of excreta and other mater, accommodating sensors and electronics that monitor various aspects and/or uses of the toilet, elements which enable adjustments to the amount of flush water, and preventing the flush water from leaking out of the area. Each purpose and function provides its own set of design requirements to be balanced with the other requirement. Of particular note in one embodiment are two functions associated with monitoring the deposit of excreta into the toilet: allowing for increase of the volume of the flush water and monitoring a property of the flush water related to the volume of the flush water. In alternative embodiments, the volume of the flush water contained does not change, but the spillover from volume being added to the flush water is measured.

There are many ways to adjust the volume of flush water. The chosen design will consider the factors mentioned above. In one preferred embodiment, the flush water volume is constrained by the geometry of the parts which contain it, including the bowl and piping. The maximum volume of flush water is additionally determined by the height of the p-trap and the amount of meniscus that the flush water can form before spilling over the bend in the p-trap (the meniscus is influenced by, among other things, the surface tension of the flush water and whether the incident surface of the p-trap compromises the formation of the meniscus, such as by being wet). In many toilets, the meniscus formation, the force of the flush, and subsequent evaporation are what control the volume of flush water in the toilet and do not necessarily provide the same amount of flush water at each use. In one preferred embodiment, a consistent amount of flush water is desired for reasons including providing a more consistent measurement scenario and setting or even maximizing the amount of excreta volume that can be measured before spill-over makes it appear that the volume is no longer increasing.

There are many mechanisms or flush water volume regulation systems that can be used to increase or decrease the amount of flush water as measure by the flush water sensor. Some change the amount of flush water in the toilet. These mechanisms or regulators may utilize gravity flow, siphons, or otherwise existing pressure differentials to add to or remove flush water and selectively restrict the flow with physical barriers such as valves, gates, or tubes that constrict or expand. The selective restriction of flow may be electronically controlled, such as a processor actuating a solenoid on a valve. It may also be mechanically controlled, such as using a float configured to open and close a valve. Other common volume regulators use additional energy to induce the flow and may manifest as equipment such as pumps, turbines, or mechanical scoops. Others mechanisms or regulators make adjustments to the shape of the volume to change the amount of flush water that is apparent to the flush water sensor, such as moving the walls of the fluid pathways containing the flush water or filling or emptying a bladder.

In one preferred embodiment and particularly to maximize the measurement capacity of the toilet, the flush water level is lowered from the level initially created following the flush of the toilet. More preferably, the flush water level is drained until a desired flush water level is reached. In one preferred embodiment, the flush water level is reduced to approximately 450 mL below the maximum. In another preferred embodiment, the flush water level is reduced to approximately 500 mL below the maximum. In a third preferred embodiment, the flush water level is reduced to approximately 1000 mL below the maximum. Alternatively, the flush water level may be increased to a desired flush water level following a flush of the toilet. One reason for using a desired flush water starting level during an excreta event is to ensure that increases in volume due to user deposits of excreta into the toilet occur in a flush water range for which the flush water sensor is optimized. One element of optimization for the flush water sensor is ensuring the sensor has adequate resolution. Another element is that the flush water sensor, response can be specified as either strictly increasing or strictly decreasing.

In an alternative embodiment, the volume of flush water does not change, but the shape of the volume of flush water is changed to allow for the desired amount of volume to be measured. For example, a sidewall of the fluid passages containing the flush water maybe repositioned so that the same volume of flush water has a higher or lower top surface level, thus repositioning the top surface relative to the flush water sensor. In another example, a bladder or similar device may be filled or emptied to reposition the location of the top height of the flush water. It is also possible to change the reading of the flush water sensor by moving the sensor relative to the flush water. For example, raising or lowering the pressure sensor will correlate to a relative decrease or increase in the pressure read by the sensor. Similarly, raising or lowering the proximity sensor will correlate to a relative decrease or increase in the amount of wave detected by the sensor.

One preferred embodiment is able to measure 450-500 mL before spillover. This is sufficient to measure volumes of excreta which are that size or smaller but renders difficult the measurement for volumes over that. This embodiment is deemed to provide a fair balance between measurement of excreta and other factors such as providing a barrier between the sewer air and the environment and flush efficiency of the toilet.

Alternative embodiments may look to increase the possible excreta volume measurement while still optimizing other functionality of the toilet. In one preferred embodiment, some possible ways of increasing the measurable volume change of the flush water include changing the geometry containing the flush water at or near the connector flush tube. FIGS. 4A-8B show various ways of doing this. A common trait to the embodiments in these figures is that the additional volume for the flush water remains open to gage pressure so the flush water flow into these areas is not restricted by a pressure build up. Preferably, any overflow of the maximum flush water level is into the drain. More preferably, the access to gage pressure for the additional flush water area is above the maximum fill of the p-trap so any flush water in excess of the maximum will overflow the p-trap rather than the access.

Figure 4A:
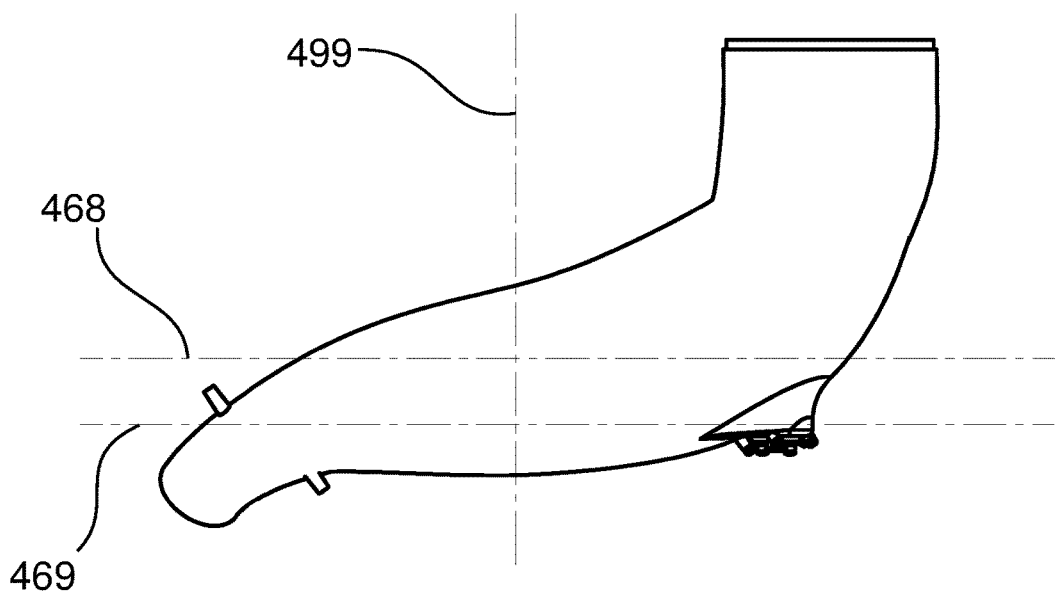
FIG. 4A is a side view of a first exemplary embodiment of a connector flush tube according to the present disclosure.
Figures 4B, 4C, 4D:
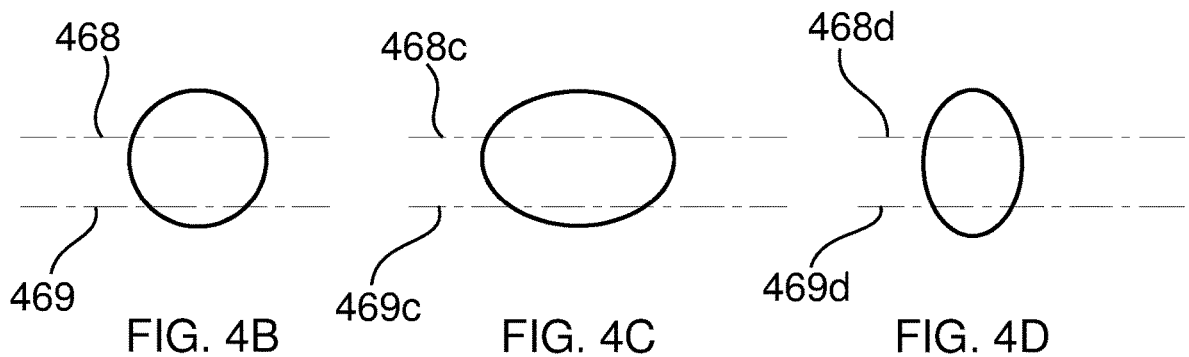
FIG. 4B is a first cross-section view of the connector flush tube of the embodiment of FIG. 4A.
FIG. 4C is an alternative second cross-section view of the connector flush tube of the embodiment of FIG. 4A.
FIG. 4D is a second alternative cross section view of the connector flush tube of the embodiment of FIG. 4A.

Referring to FIGS. 4A-4D. FIG. 4A shows a side view of connector flush tube 460. It also shows flush water maximum height 468, flush water starting height 469, and FIG. 4B cross section line 499. FIG. 4B shows a cross section of connector flush tube 460 along with flush water maximum height 468 and flush water starting height 469. FIG. 4C shows an alternative cross section of connector flush tube 460 along with flush water maximum height 468c and flush water starting height 469c. FIG. 4D shows another alternative cross section of connector flush tube 460 along with flush water maximum height 468d and flush water starting height 469d. The different cross sections provide different cross-sectional areas for the flush water and therefore may allow for different total flush water volume between the flush water starting and maximum heights.

FIGS. 5A-8B in particular show various embodiments with a small opening into the area where flush water is measured, the goal being to provide an additional location for flush water to be collected for measurement during an excretion event prior to flush water spilling over the p-trap. The geometry of the small opening is meant to allow sufficient flush water flow between the two areas while at the same time minimize negative effects on the flush power of the toilet, such as the flushing capability of the tank water as it flushes through the toilet to the drain. Common negative effects include the geometry introducing hydrodynamic responses that restrict or interrupt the fluid flow, including increased drag, turbidity, low pressure regions, and eddies.

Preferably, the embodiments in FIGS. 5A-8B have some other commonalities. For example, each may include a connection for a supply of water and/or other cleaners to flush the flush water from the additional location so it may be cleaned out when desired, such as during a flush cycle. Each may also include its own mechanism for determining the amount or volume of flush water in the area, such as a float, proximity sensor, pressure sensor, weight sensor, an image sensor such as a camera that can see the fluid height relative to the container holding flush water in the additional location, or a combination of sensors and/other instrumentation. Another commonality is that at least part of the connection between the connector flush tube and the additional location is below the maximum height of the flush water to facilitate filling of the additional location before spillover. Additionally, for the purpose of providing more flush water volume expansion before spilling over the p-trap during potential excreta events, the geometry of the expansion area is much less important than the location and geometry of the connection between it and the flush water. In one preferred embodiment, the connection is above the minimum flush water height so the expansion area does not fill up until after potential excreta events begin.

Figure 5A:
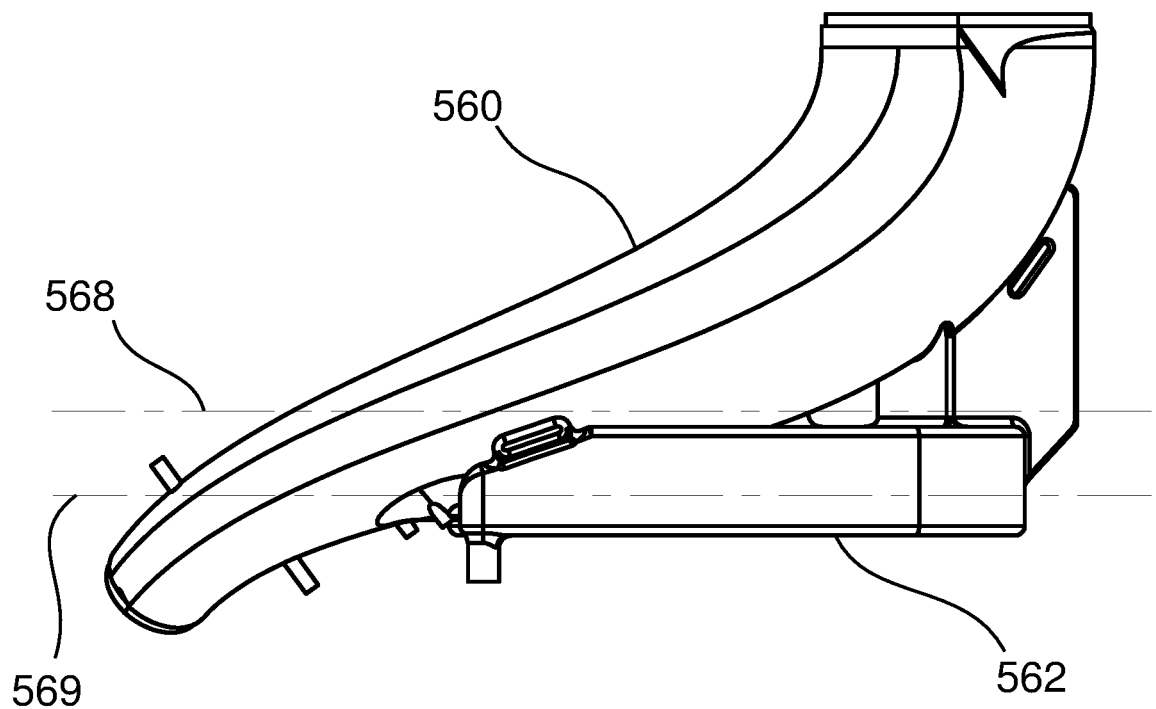
FIG. 5A is a side view of a second embodiment of a connector flush tube according to the present disclosure.
Figure 5B:
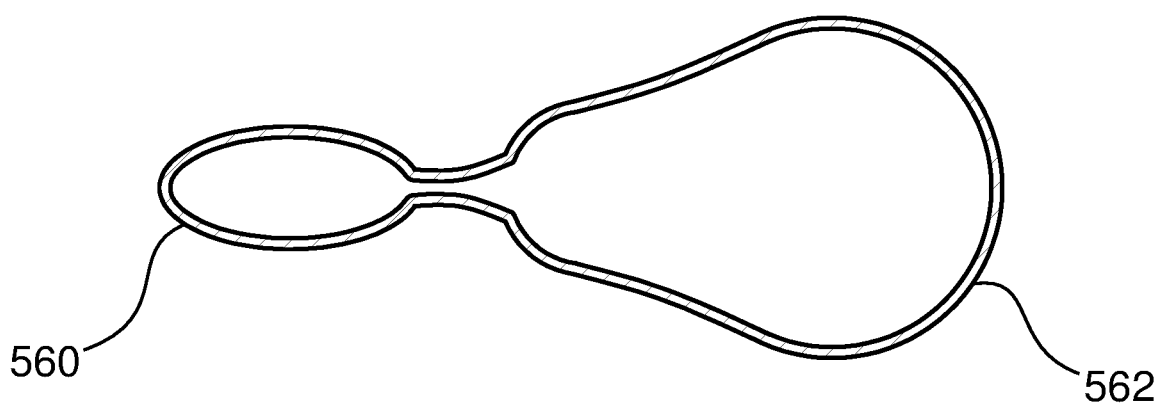
FIG. 5B is a cross section view of the connector flush tube of the embodiment of FIG. 5A.

Referring to FIGS. 5A-5B. FIG. 5A shows expansion area 562 attached to connector flush tube 560. It also shows flush water maximum height 568, flush water starting height 569. FIG. 5B shows an internal diagram of the expansion area 562 connecting to connector flush tube 560.

Figure 6A:
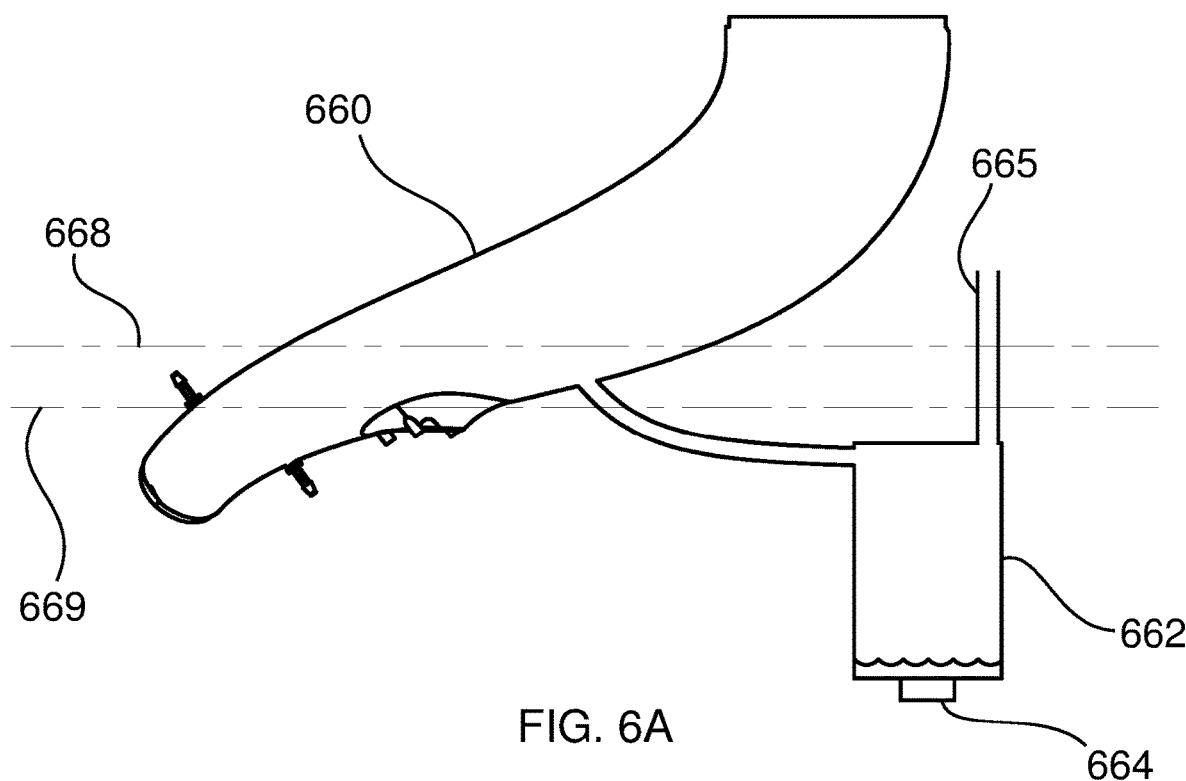
FIG. 6A is a side view of a third embodiment of a connector flush tube according to the present disclosure.
Figure 6B:
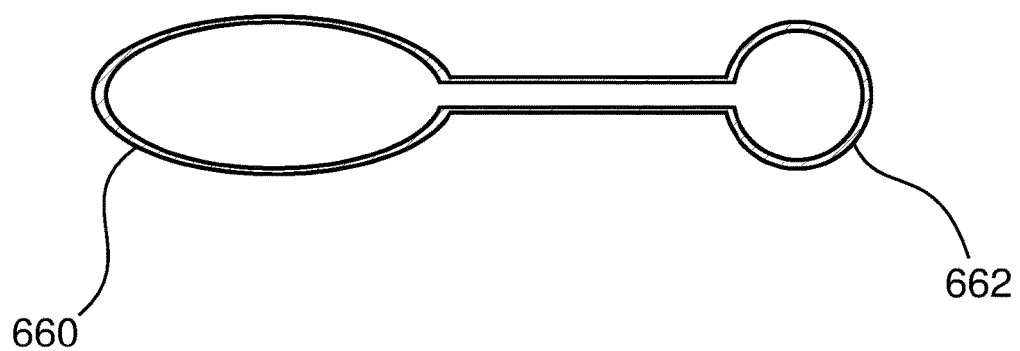
FIG. 6B is a cross section view of the connector flush tube of the embodiment of FIG. 6A.
Figure 6C:
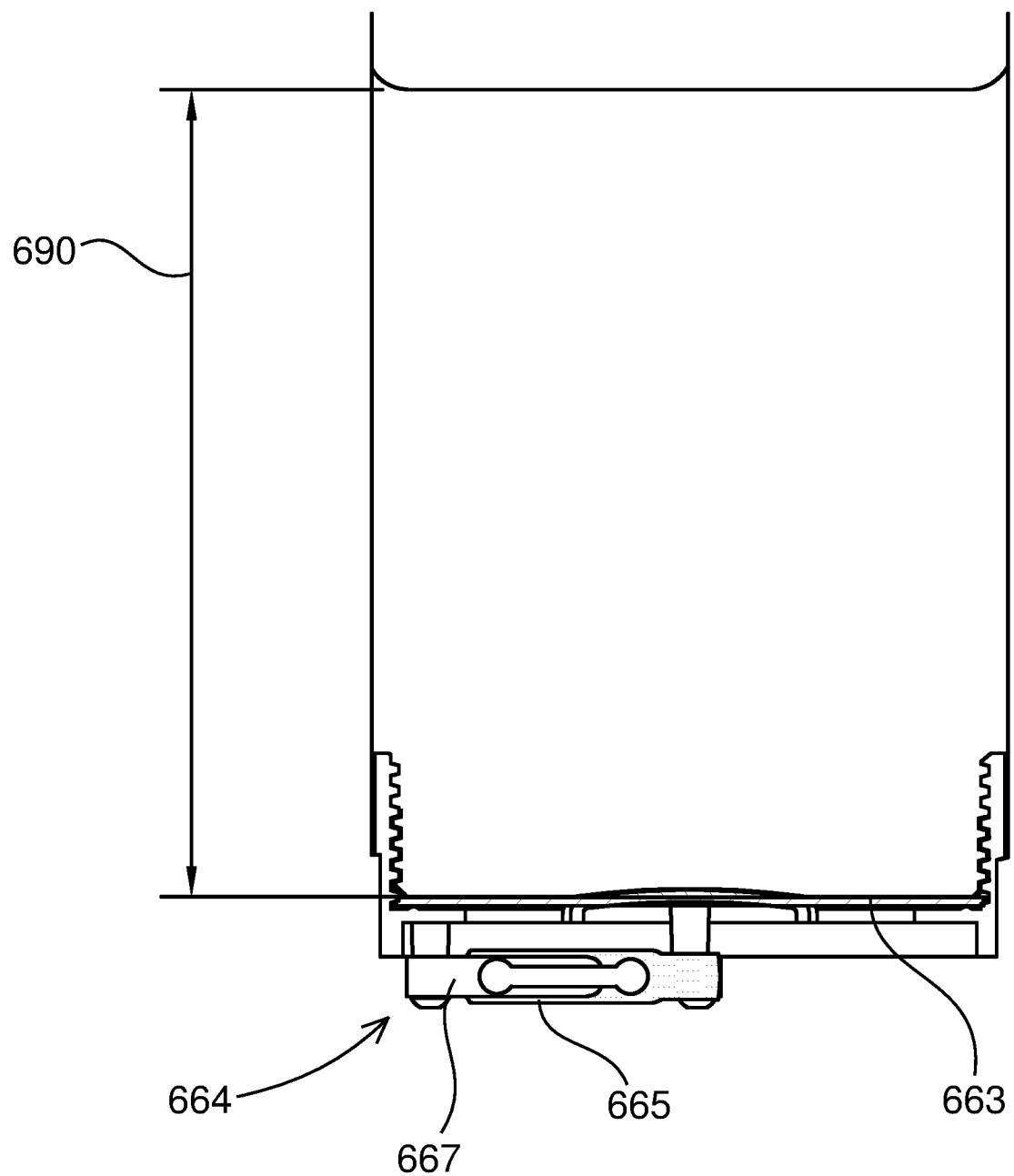
FIG. 6C is a cross section view of the expansion area of the embodiment of FIG. 6A.
Figure 6D:
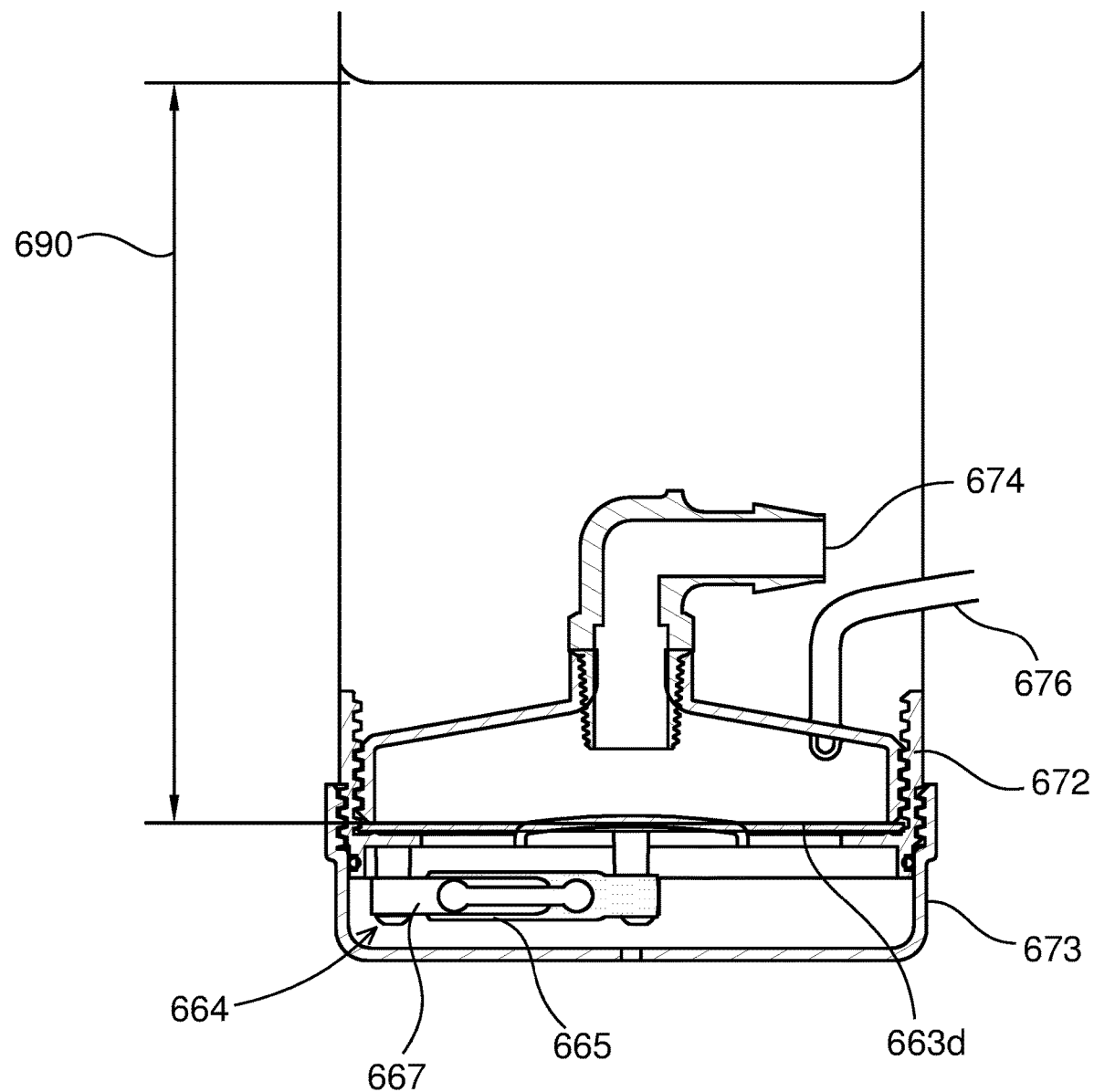
FIG. 6D is a cross section view of an alternative expansion area of the embodiment of FIG. 6A.

Referring to FIGS. 6A-6B. FIG. 6A shows expansion area 662 attached to connector flush tube 660. Expansion area 662 includes opening 665 which can facilitate leaving expansion area 662 open to gage pressure and/or flushing flush water from expansion area 662. It also shows flush water maximum height 668, flush water starting height 669. Also pictured is additional volume sensor 664. In one preferred embodiment, volume sensor 664 is a load cell. FIG. 6B shows an internal diagram of the expansion area 662 connecting to connector flush tube 660. If there is physical space, the expansion area can go much lower in elevation than other portions of the toilet's fluid pathways, allowing for an increase in volume capacity for the expansion area without expanding it outward.

Figure 7A:
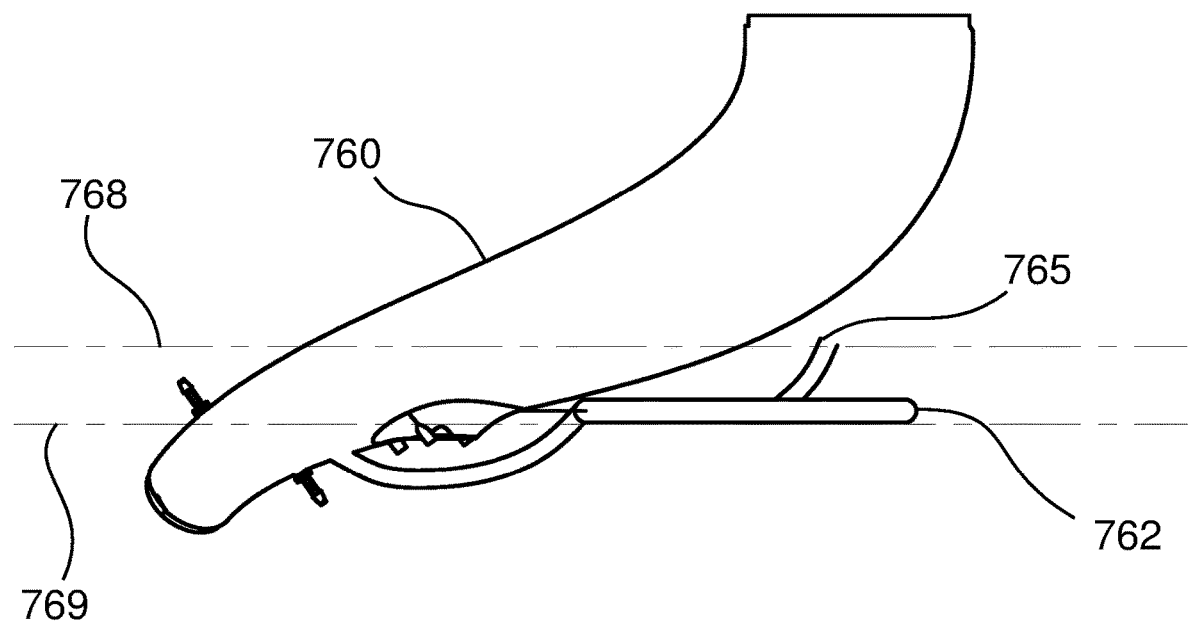
FIG. 7A is a side view of a fourth embodiment of a connector flush tube according to the present disclosure.
Figure 7B:
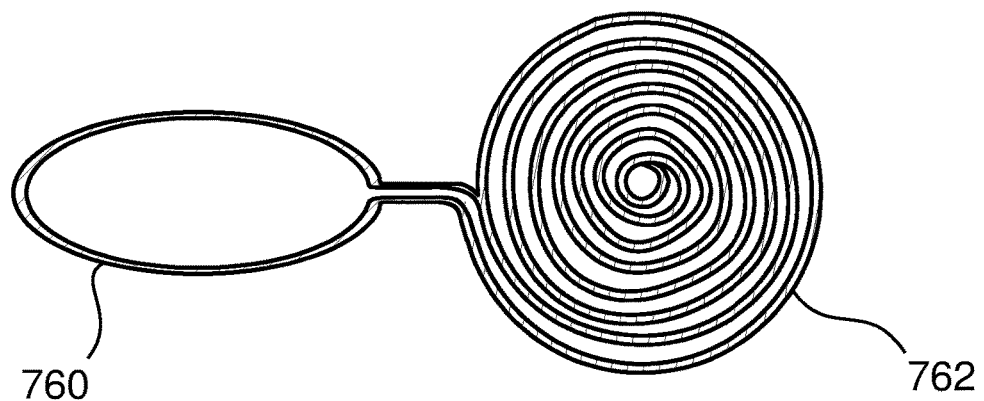
FIG. 7B is a cross section view of the connector flush tube of the embodiment of FIG. 7A.

Referring to FIGS. 7A-7B. FIG. 7A shows expansion area 762 attached to connector flush tube 760. Expansion area 762 includes opening 765 which can facilitate leaving expansion area 762 open to gage pressure and/or flushing or cleaning flush water from expansion area 762. It also shows flush water maximum height 768, flush water starting height 769. FIG. 7B shows an internal diagram of the expansion area 762 connecting to connector flush tube 760. One benefit of using a tube rather than a more open, chamber style expansion area is that it is often easier to clean a tube than a more open area. One drawback of a tube over an open area can be that the structure of a tube may take up more physical space and there are often tight physical space constraints within toilets and their placement within a restroom.

Figure 8A:
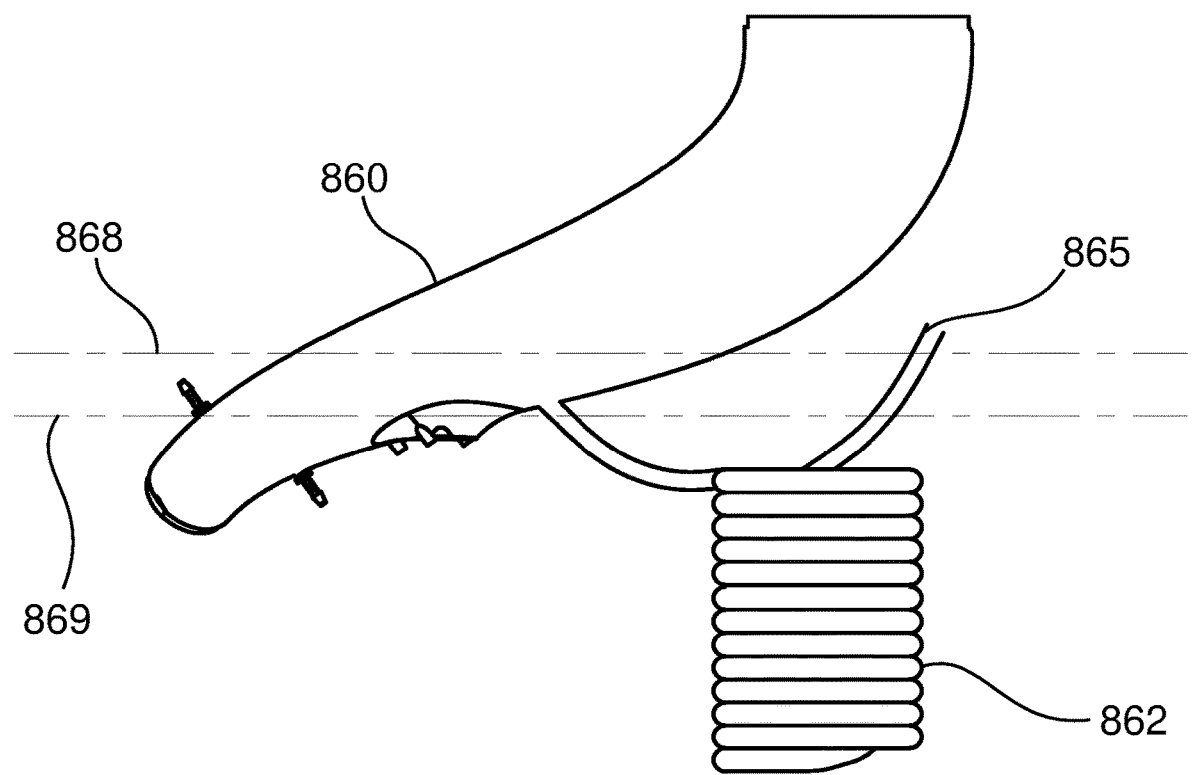
FIG. 8A is a side view of a fifth embodiment of a connector flush tube according to the present disclosure.
Figure 8B:
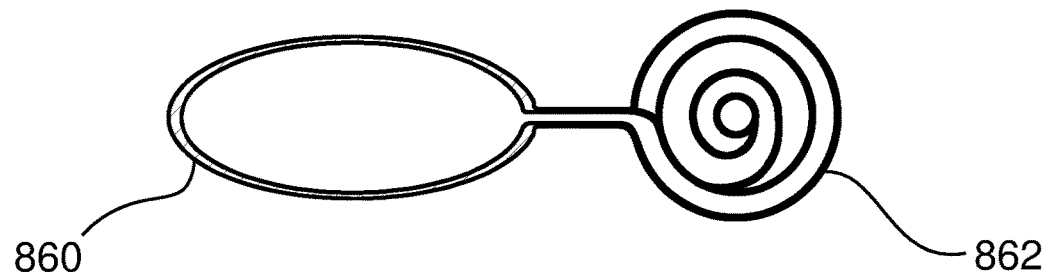
FIG. 8B is a cross section view of the connector flush tube of the embodiment of FIG. 8A.

Referring to FIGS. 8A-8B. FIG. 8A shows expansion area 862 attached to connector flush tube 860. Expansion area 862 includes opening 865 which can facilitate leaving expansion area 862 open to gauge pressure and/or flushing or cleaning flush water from expansion area 862. It also shows flush water maximum height 868, flush water starting height 869. FIG. 8B shows an internal diagram of the expansion area 862 connecting to connector flush tube 860. One benefit of the embodiment in FIGS. 8A and 8B are its combination of increased depth from the embodiment in FIGS. 6A and 6B and the ease of cleaning compared to the embodiment depicted in FIGS. 7A and 7B.

Regarding monitoring a property of the flush water related to its volume, in one preferred embodiment, a characteristic related to the volume of the flush water is measured. As measured, the characteristic may be a relative value that is compared to the value at another time or representative of the whole volume of flush water that does not need to be compared to another measurement. The characteristic of the volume may be determined from any number of properties, including its total weight, the pressure exerted at a specific location, or the height of the top surface. In one preferred embodiment, a pressure sensor monitors the pressure exerted by the flush water at a location below the top surface of the flush water. The pressure sensor may be in direct contact with the flush water or may be separated from the flush water by a membrane, diaphragm, or other physical barrier that still transfers at least some of the force exerted by the flush water. Additionally, the pressure sensor may be remote from the flush water and have a pressure transmitting connection such as a tube of fluid at the previously mentioned location. The height of the top surface of the flush water can change, so the pressure monitoring location does not always have to be below the top surface of the flush water; this can affect the effectiveness of the sensor. In one preferred embodiment represented in FIG. 6C, load cell 664 comprises metal bar 667 with strain gauges 665 mounted on it. For example, the Mini Load Cell—500 g, Straight Bar (TAL221) sold by Sparkfun at the web address https://www.sparkfun.com/products/14728) is a suitable pressure transducer. When the height 690 of the liquid column changes, the force exerted through diaphragm 663 on metal bar 667 changes. Then the flex of metal bar 667 changes. Then the electrical signal from strain gauges 665 change. The electrical signal from strain gauge 665 is recorded over time. By means of calibration, a relationship between electrical signal, liquid height and/or volume is established. An advantage this device has over a proximity sensor is that this device is sensitive over a much larger range of liquid heights. It also is unresponsive to debris in the water. In an alternative embodiment represented in FIG. 6D, diaphragm 663*d* is housed within chamber 672 which isolates it from debris in the flush water. It may have port 674 which is open to and in fluid communication with the flush water. It may also have rinse tube 676 from which a supply of tank or other rinsing water may clean out the chamber; preferably, rinse tube 676 will be angled so as to create a vortex in the chamber during clean out. Additionally, cap 673 encloses load cell 664 so flush water does not leak out of the chamber if diaphragm 669 ruptures.

In another preferred embodiment, a proximity sensor is used to monitor the height of the flush water by emitting electromagnetic (such as light or near visible light waves) or pressure waves (such as acoustic waves), the waves reflect off the top surface of the flush water, and the sensor monitors the return the waves. More preferably with the proximity sensor embodiment, the proximity sensor is located below the top surface of the flush water. Alternatively, the proximity sensor is located above the top surface of the water. Additionally, the relative location of the proximity sensor to the top surface of the flush water may change as the flush water height changes—this may nullify readings of the proximity sensor for some volumes of the flush water. The proximity sensor maybe in direct contact with the flush water or maybe separated from the flush water by a material which still allows for the transmission of the waves. With this type of proximity sensor, the strength of the waves being measured by the sensor can be correlated to specific or relative volumes of the flush water and/or excreta therein.

The toilet is configured to receive excreta from the user and measure the volume of the excreta as it is received by the bowl and into the flush water. Preferably, the toilet is capable of raising and lowering the flush water level, allowing the toilet to set the flush water to a level below the spillover in the P-trap. In one preferred embodiment, the volume of excreta is determined by measuring the change in the volume of the flush water. In such an embodiment, it is beneficial for the flush water volume to increase without a portion of the flush water draining away from the main portion of flush water. Once implemented for general use, the toilet preferably experiences a cycle such as the following:

1. Prior to a user using the toilet:
   i. The water sensor detects the amount of flush water;
   ii. The amount of flush water is compared to a preferred amount of flush water;
   iii. If there is too much flush water, some of the flush water is drained;
   iv. If there is not enough flush water, additional water is added to the flush water.
2. During and after a user uses the toilet, including depositing excreta into the toilet:
   i. A user positions themselves so as to be able to deposit excreta into the bowl of the toilet, usually in a sitting or standing position;
   ii. The user deposits excreta it into the bowl.
   iii. The bowl receives the excreta and at least some of the excreta settles into the flush water.
   iv. As the excreta is received into the flush water, the volume or water level of the flush water is monitored by the flush water sensor.
   v. The flush water sensor data is used to determine one or more properties related to the volume or amount of excreta deposited into the toilet, for example:
      a. The change over time of the flush water volume or height can be used to determine the flow rate of excreta.
      b. The total change in flush water volume or water level can be used to determine the total amount of excreta deposited.
      c. The volume, amount, or flow rate of a specific excreta type, such as urine or feces, can be separated out from the rest of the flush water volume data.
   vi. The data and/or results are used further, which may manifest as:
      a. Comparing or adding the data and/or results to a database based on historic data and/or results, derived from this user and/or at least one other person.
      b. Using the data and/or results to determine a probable health or wellness state or condition of the user.
      c. Making the data and/or results available to the user.
      d. Making the data and/or results available to a health, wellness, or care provider.
   vii. When the user has completed their use of the toilet, the toilet rinses the bowl and flushes the flush water with water from the water tank. Alternatively, the water comes directly from a supply pipe such as may be found in commercial toilets which forego a water tank; these supply pipe generally have a higher water pressure requirement than residential toilets.

In one preferred embodiment, the toilet is pre-calibrated by adding one or more known volumes to the flush water and associating that known volume with data generated by the flush water sensor.

In one preferred exemplary embodiment, the user is identified so the data and results are associated with the user, this can be done in a variety of ways, including:

1. The user or another person manually inputting an identifier into a user interface in communication with the toilet or a remote device such as a cloud-based service. The user interface may be integrated into or mounted on the toilet, positioned near the toilet, at the entrance to or within an area of controlled access including the toilet, on a mobile or other personal electronic device, or a remote location (which may be preferable if the identifier is input by an observer monitoring or controlling who and/or when a user is allowed access to the toilet).
2. The toilet—or a nearby device in communication with the toilet or a remote device such as a cloud-based service—detecting an electronic signal associated with the user, such as from an electronic device. The signal may include a wireless signal generated by an RFID tag, cellular phone, wi-fi device, Bluetooth device, other smart device, or other electromagnetic wave producer.
3. The toilet—or a nearby device in communication with the toilet or a remote device such as a cloud-based service—detecting one or more property of the user, which can be compared to a database of users and may identify the user as a specific user, a new user, and/or a return user. There are a variety of sensors that can be incorporated with or near the toilet to detect the properties of the user, including PPG sensors, weight or pressure sensors, visible or near visible imaging sensors, acoustic sensors, capacitive or bioimpedance sensors. There are a variety of properties that can be used to identify a user, including height, weight, posture, heart rate, epidermal characteristics (e.g., fingerprints, pigmentation, skin oil, hair distribution, pores, veins, etc.), sound, and detectable volatile organic compounds to name a few.

Data from the flush water sensor which contains an excreta event can be used to determine various properties about the excreta event. There are a multitude of ways in which this data can be analysis. Additionally, excreta event data from the flush water sensor can be combined with data from other sensors and/or historic excreta events to provide relevant information about a person's excreta event and/or overall health and wellness. One way of analyzing the data is to upload it to a neural network that has been trained to analyze the data. Preferably, the neural network is capable of image processing. The flush water sensor data with a probable excreta event is used to create an image (e.g., a plot of the sensor data over time) readable by the neural network, the image is analyzed by the neural network, and the neural network associates one or more portion of the image with an excreta-type (such as urine, feces, urine and feces, other, and/or non-excreta). This information can be output, used to derive additional information about any excreta events (e.g., flow rate or total volume of an event), and/or used in combination with other data in the neural network to estimate a person's health or wellness. Alternatively, as described in more detail in later paragraphs, the data can be processed and/or analyzed without a neural network to identify excreta events and glean information such as flow rate and/or total volume of an event.

The form in which the data and/or results are presented can vary widely and will depend on many factors, including intended audience, what information is relevant or helpful to the intended audience, ease of communicating information, cost, and timeliness among others. Data may be used exclusively from one use of the toilet or may be used in concert with data from previous uses of the toilet or from another device. This can facilitate producing additional results that depend on data from multiple uses of the toilet, such as trends over time. This can also facilitate analysis based on larger datasets which include data from other sensors and/or testing methods. Some exemplary sensors or testing methods including imaging sensors, MOS/CMOS, CCD, spectrometers, volume measurement devices, weight sensors, chromatographs, FET, nanoFET, MOSFET, mass spectrometers, electrodes, microphones, load cells, pressure gauges, PPG, temperature gauges, thermometers (including IR and thermocouples), rheometers, durometers, pH detectors, and scent detectors. Examples of ways the data and/or results are presented include:

1. A color or light system on or near the toilet that indicates a characteristic of the results, such as whether the analysis was completed successfully, whether the user was successfully identified, whether the data was successfully associated with a user, and/or whether additional health or wellness care should be pursued.
2. A summary of the data, especially one that draws attention to potential health and wellness concerns (or the lack thereof), such as normal excreta activity, abnormal urine flow, lose or diarrhetic stools, whether the user is sufficiently hydrated, and/or trends over time.
3. A detailed overview of the data and/or results, including breakouts of specific portions of the data/results.

In one preferred embodiment, certain challenges are associated with getting excreta measurements from the flush water volume. The toilet bowl is not optimized exclusively for urodynamics measurements. As a consequence, a resonant oscillation and other sources of noise read by the water sensor need to be considered to improve the usability of the raw data. As opposed to a dedicated urodynamics instrument, which only receives urine, a toilet bowl and flush water receive a variety of excreta types and foreign material, which can include urine, feces, toilet paper, bidet water, and other materials such as vomit and non-excreta waste. Also, pressure variations on either the bathroom side of the flush water or the sewer side of the flush water can introduce noise which interferes with relevant measurements. Thus, the algorithms which process the sensor data preferably provide quantitative metrics and also differentiate between urination, defecation, pressure changes, and other additions to the flush water. Additionally, data from other sensors incorporated in or near the toilet can aid in differentiation. Additional information about the user may also guide algorithms. Preferably, multiple sources of information are used to make decisions regarding the toilet and user data.

One preferred exemplary algorithm sequence is as follows:

1. Raw proximity sensor data is converted to time series volume data with the aid of calibration information.
2. The volume data of Step 1 is subject to a low-pass filter that almost completely removes features shorter than 2-4 seconds, which encompasses the range of the period of bowl oscillations. From the result, excreta events are detected, urination and defecation volumes are determined, and urination flow rates are determined.
3. The volume data of Step 1 is subjected to a low-pass filter that allows the resonance with a period of 2 seconds to be preserved. This resonance correlates with high flow rate additions, such as with defecation. This resonance can be used to mark a defecation event.
4. With the aid of the above filters, tables are created of excreta candidates and defecation candidates.
5. The candidates in the tables are subjected to a variety of tests. Each candidate is classified as either a "urination event", a "defecation event", or is rejected. Many times, defecation and urination occur at the same time. In one preferred embodiment, these mixed events are treated as defecation events. Alternatively, these mixed events can be handled differently, such as being classified as a "mixed event" or separating the increased volume from the mixed event into its urine and feces volume components.
6. Each excreta event that passes the tests in Step 5 is quantified. Data classified as being from a urination event can be used to determine an event's urination volume, average flow rate, maximum flow rate, duration, and/or other metrics.

In one preferred embodiment, the water sensor regularly monitors the flush water volume. In this case, one preferable objective of the algorithm process is to minimize incorrect classifications. For example, the algorithm man be configured to recognize data as representing a toilet paper drop into the flush water or pressure fluctuation near the flush water rather than an excreta event. As another example, the algorithm could recognize a urination event as different from as defecation event.

In one preferred embodiment, a proximity sensor is located in the full tube. It provides an intensity response that is related to liquid level. This can be achieved through the use of an electromagnetic wave emitter bouncing waves off of the surface of the flush water and measuring the intensity of the returning waves with an electromagnetic wave receiver.

Figure 9:
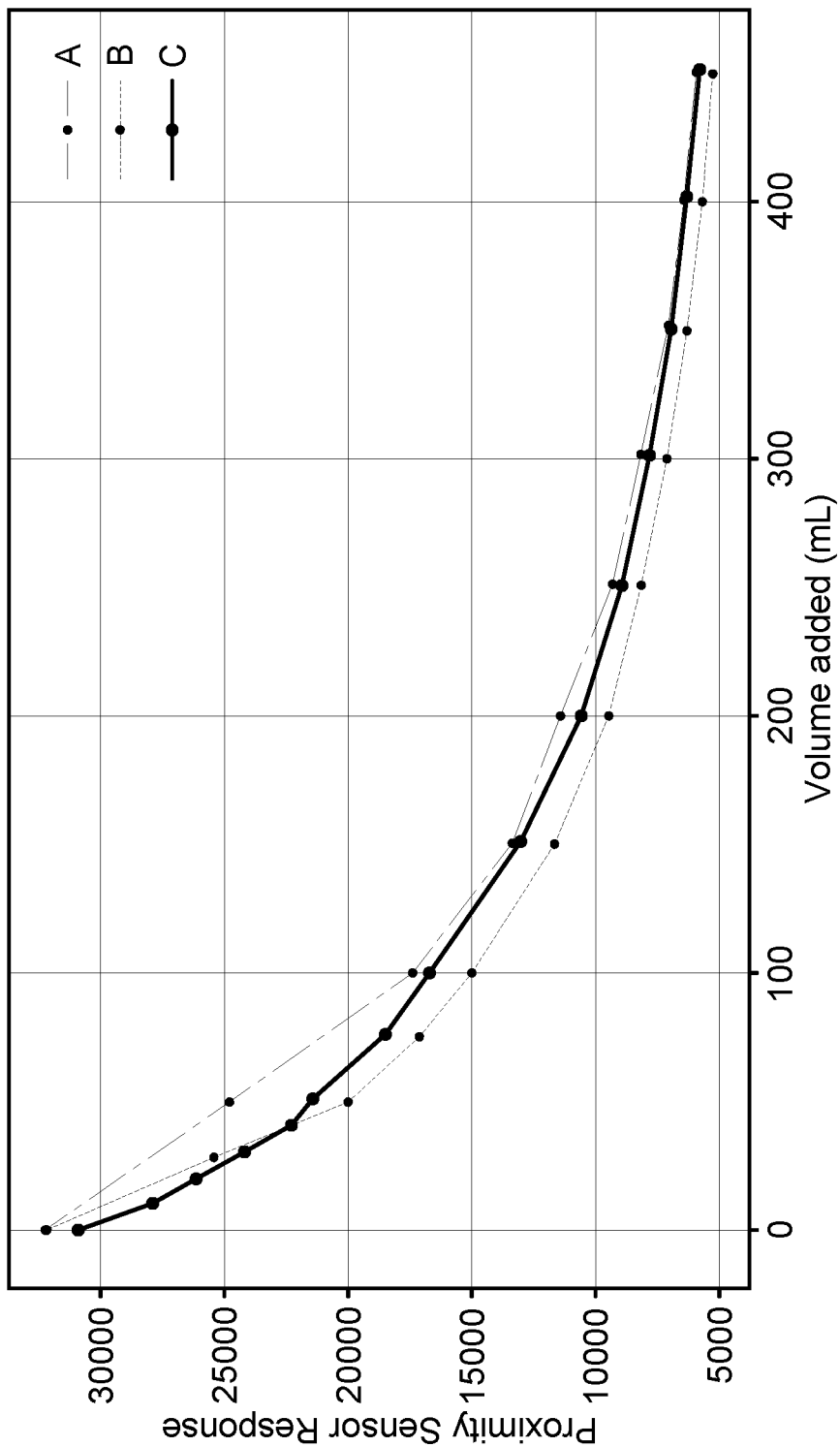
FIG. 9 is a graphical representation of volume data measured in a toilet of the present disclosure.

In one preferred embodiment, calibration is carried out. More preferably, calibration is only required in the factory. In another embodiment, calibration may be completed in the factory and may be completed if the volume sensor characteristic changes over time. Alternatively, on a weekly basis a calibration is carried out that relates proximity sensor response to volume added to bowl, starting from a specified response. This creates a calibration curve based on the data relating specific volume changes to specific responses of the proximity sensor. FIG. 9 shows example sets of proximity sensor calibration data gathered in 2017 and 2018 for a toilet with a proximity sensor as the flush water sensor. Along the bottom of the graph (x-axis) is the volume added to the toilet in mL. Along the left side of the graph (y-axis) is the proximity sensor response, or the signal from the proximity sensor. Each line represents data from one calibration. A similar process for calibration could be performed for other sensors as well.

Figure 10:
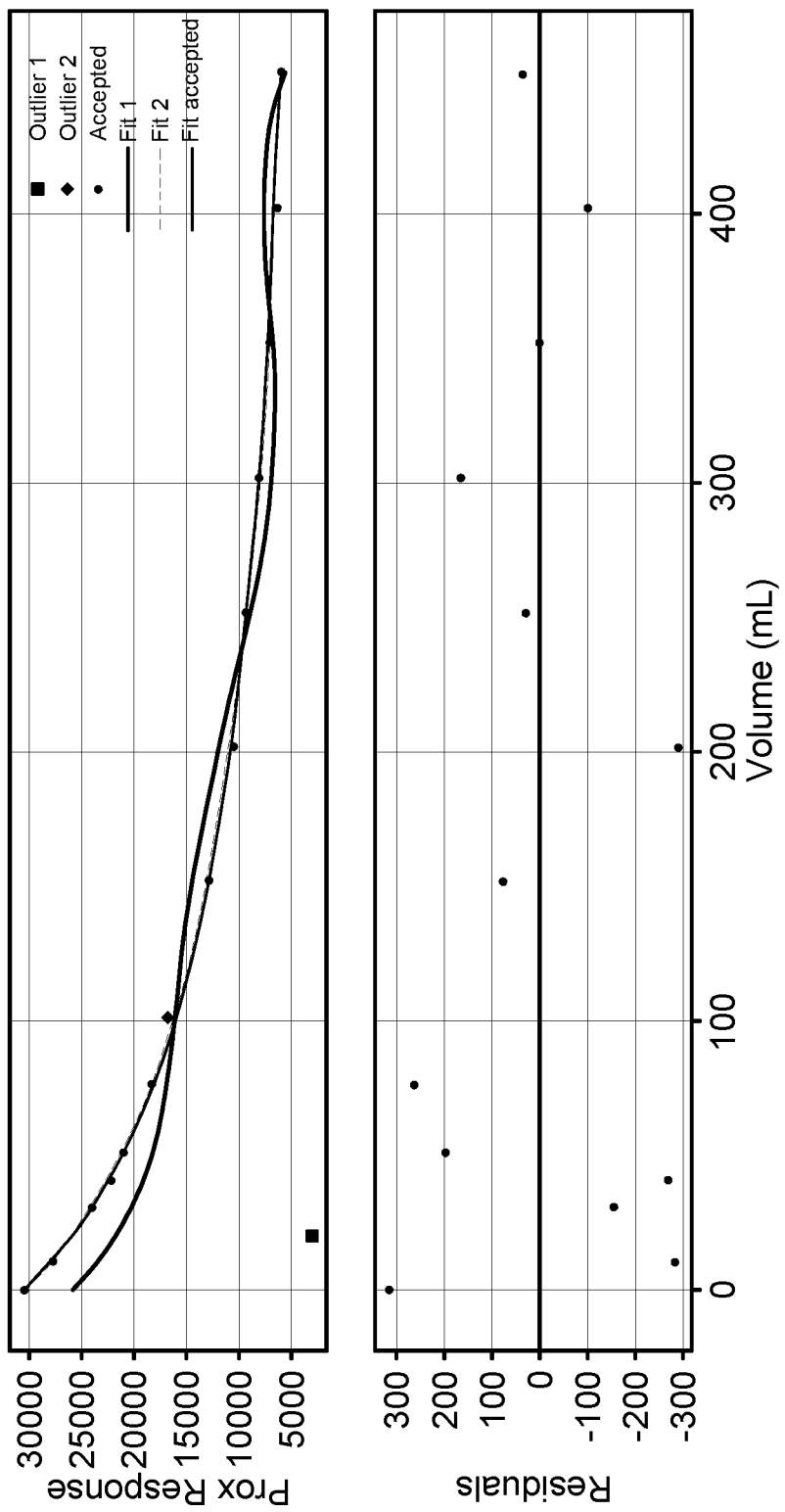
FIG. 10 is a graphical representation of processed volume data measured in a toilet of the present disclosure along with data on the residual relative to a line fit to the data.

In this embodiment, when sensor data from an excreta event is analyzed, the most recently preceding calibration curve is applied to obtain flush water volume data. Before the calibration data is used, an outlier removal routine is applied. The routine fits a spline to the data and rejects the largest residual that is greater than a threshold. The process is repeated until no outliers are greater than the threshold. FIG. 10 shows a couple of graphs which provide an example of proximity sensor calibration data outlier rejection. The x-axis of both graphs shows the volume in mL. The y-axis of the top graph shows the response of a proximity sensor flush water sensor. The y-axis of the lower graph shows the residuals after removal of the outliers. The top graph shows a set of proximity sensor calibration data and some "fit" lines based on data, which could be understood to be trend lines for the applicable data. Fit 1 is before rejection of any outliers in the data. Fit 2 and Fit accepted are iterations after one or more outlier has been rejected (i.e., removed from the set of data being used).

Figure 11:
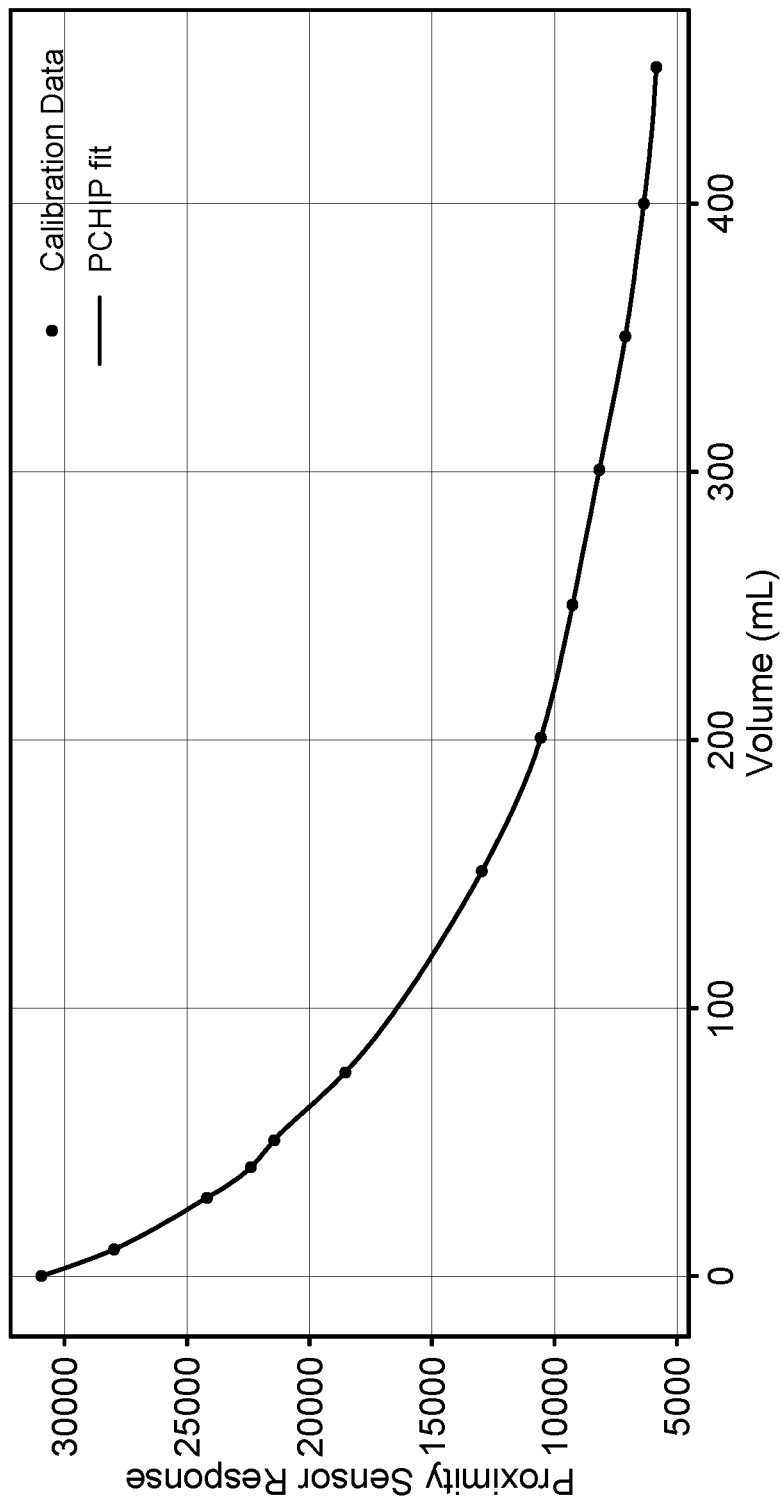
FIG. 11 is a graphical representation calibration data measured in a toilet of the present disclosure and an accompanying PCHP fit.

In the above, the individual calibration data is fit using a "Piecewise Cubic Hermite Interpolating Polynomial" (PCHIP) tool available in the Python library SciPy. With PCHIP, the fit passes through each data point, as is demonstrated in FIG. 11, which shows volume along the x-axis and proximity sensor response along the y-axis. The points are data from a calibration and the line is a PCHIP fit for the data. A disadvantage of PCHIP is that the noise is fit, even after outlier rejection. A polynomial spline fit would provide better noise rejection. A reason not to use a spline is because sometimes the spline fit is not monotonic between 400 and 450 mL; this could be resolved in many ways, one of which is with more sophisticated outlier rejection. To improve the quality of the calibration data, some automation of the calibration procedure or real-time outlier checking may be helpful.

With a proximity sensor, the volume sensitivity is high at low volumes and decreases as the volume in the bowl increases. This can be seen in FIG. 9. A different setup for sensing the flush water volume could have higher sensitivity. Such alternatives could improve sensitivity over the entire range of detection or could focus on improving the sensitivity on one or more specific portions of the detection range. Improvements could come in many forms, including the number and types of sensors used for flush water volume monitoring, geometry of applicable portions of the toilet, and/or the addition of additional material into the system. Alternatives in the area of sensors include using more than one proximity sensor to cover different ranges and/or using high sensitivity pressure transducers.

Figure 12:
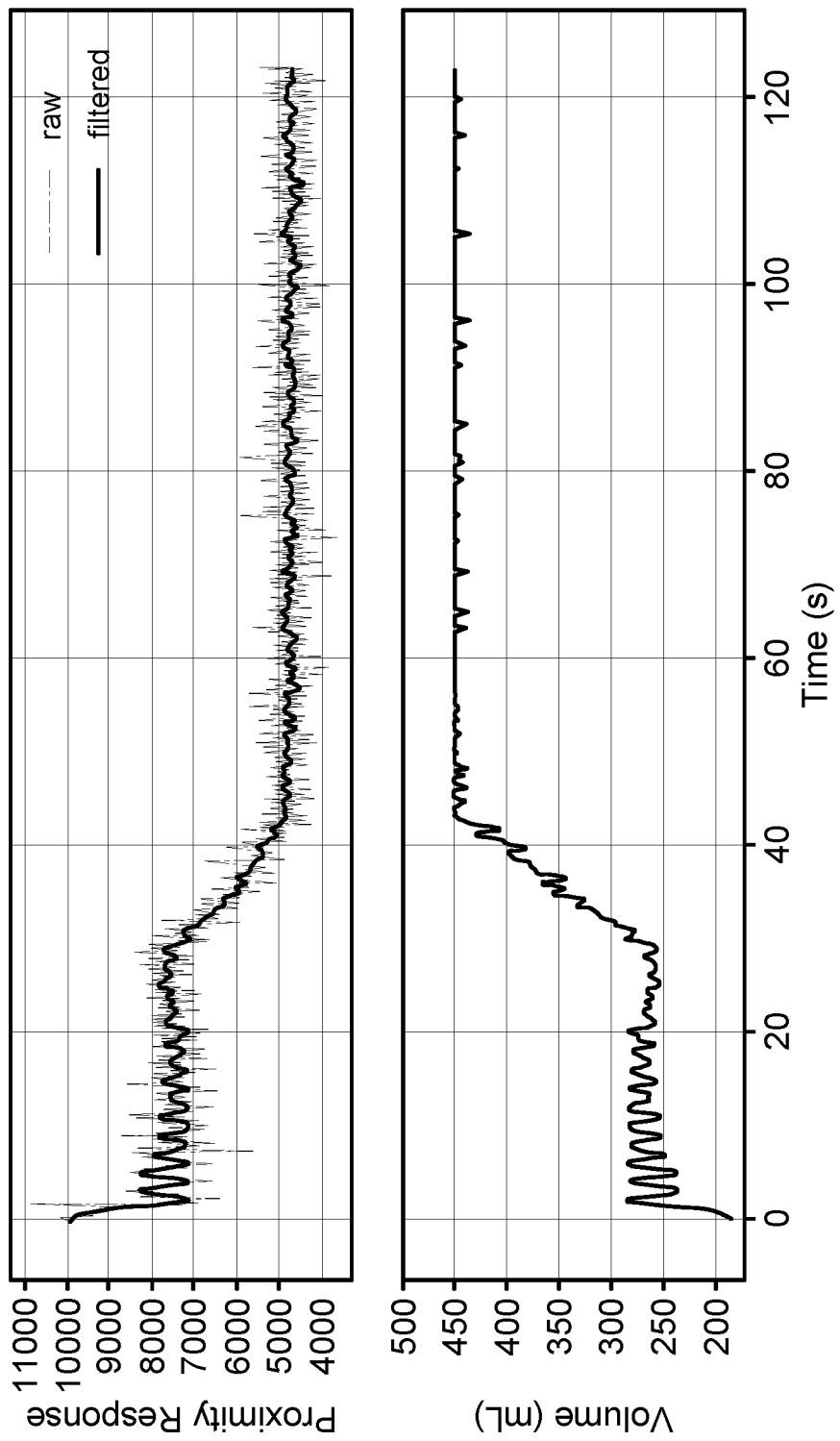
FIG. 12 is a graphical representation of volume data measured in a toilet of the present disclosure.

In one preferred embodiment, the first step in analyzing sensor data from an excreta event is to apply a Butterworth low pass filter. Then a calibration curve is applied. When the calibration curve is applied to the sensor data, any extrapolation is truncated to the maximum or minimum volume found in the calibration data. Not truncating can give very erratic extrapolation results. An example of truncation with a ceiling of 450 mL is demonstrated in FIG. 12, which shows sample data from a proximity sensor with the ceiling at 450 mL. The x-axis of both graphs shows time in seconds (s) and have the same time range. The top graph has a y-axis of proximity response and shows lines representing raw and filtered proximity sensor response. The bottom graph has a y-axis of volume in mL and has a line representing the volume over time after filtering and truncation of the data. As with the other examples above, a similar approach can be taken with other types of sensors.

Figure 13:
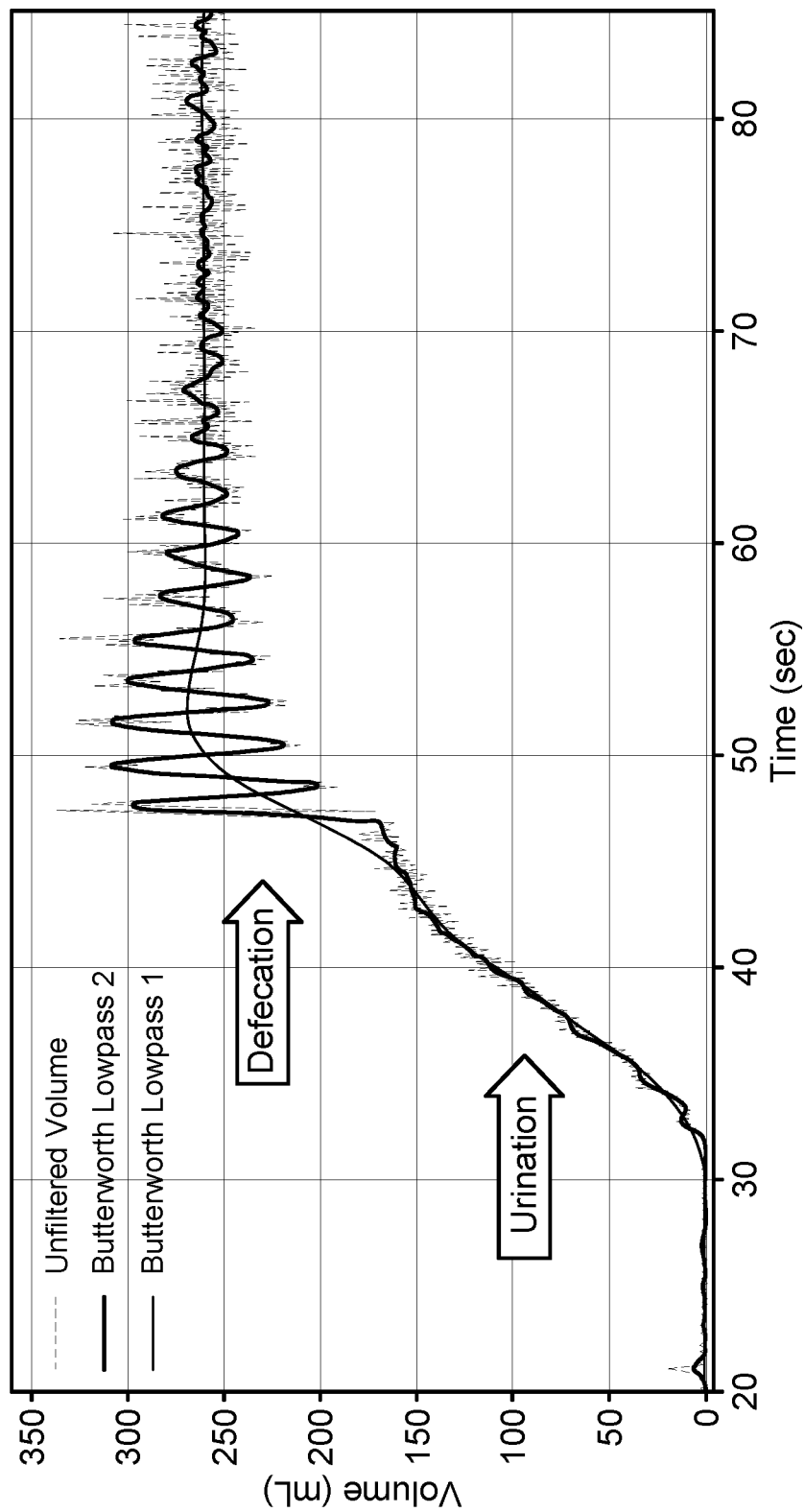
FIG. 13 is a graphical representation of volume data measured in a toilet of the present disclosure.

As mentioned above, in one preferred embodiment, a Butterworth filter is applied to the raw data before it is converted to volume data. Preferably, and as pictured in FIG. 13, two Butterworth filters are applied to the volume data. Each filter produces a volume time-series that serves a different purpose. The more aggressive filter that cuts out a larger frequency range produces a volume time-series that is used to calculate excreta volumes and urination flow rates and the like (filter 1). The less aggressive filter allows the resonant oscillations with a period of about 2 sec to pass through (filter 2). These resonant oscillations are established when there are large, quick additions to the bowl (e.g., defecation) or when there are disturbance to the pressure on either the room side or the sewer side of the flush water (e.g., a door opening, or a flush in a nearby toilet). When a user is depositing excreta into the toilet, these resonant oscillations are often indicative of defecation. FIG. 13 shows an example of volume data and has time (s) on the x-axis and volume (mL) along the y-axis. In this example, the dashed line is unfiltered data, solid like that nearly follows the unfiltered data is the Butterworth Lowpass 2 filter, and the smoother line is the Butterworth Lowpass 1 filter. This approach is not completely reliable for distinguishing between urination and defecation. Defecation does not always produce prominent oscillations. Additionally, other events, including those noted above, can produce oscillations.

Volume data from a flush water sensor has a variety of characteristics which can be categorized into "features". It is preferable to distinguishing between features that are due to excreta and features due to other effects on the system. Preferably, the process of distinguishing excreta features starts by collecting information about all features. At this stage, each feature is preferably termed an "excreta candidate". Then rules are applied to the excreta candidates to reject those that are likely not due to urination or defecation. The features that are not rejected are preferably called "excreta events".

To find excreta candidates in one preferred embodiment, the derivative is taken of filtered volume data (filter 1) to obtain flow rate. Whenever the flow rate rises above a threshold—which is 0 flow in one preferred embodiment—and then drops below it, the time period between the crossings is flagged as an "excreta candidate" and information about the candidate is added to a table. This can be seen in FIG. 14, where the arrows indicate the locations of excreta candidates.

TABLE 1

| | Start Time (sec) | End Time (sec) | Duration (sec) | Flow Rate Maximum (mL/sec) | Volume Delta (mL) | Flow Rate Average (mL/sec) |
|---|---|---|---|---|---|---|
| 1 | 20.2 | 28.8 | 8.6 | 0.5 | 1.9 | 0.2 |
| 2 | 32.0 | 43.5 | 4.5 | 0.4 | 0.7 | 0.1 |
| 3 | 39.1 | 43.5 | 4.4 | 0.2 | −0.2 | 0.0 |
| 4 | 48.1 | 71.1 | 23.0 | 16.4 | 150.2 | 6.5 |
| 5 | 73.3 | 75.0 | 1.7 | 0.1 | −2.0 | −1.2 |
| 6 | 83.1 | 89.6 | 6.5 | 0.5 | 0.8 | 0.1 |

Figure 14:
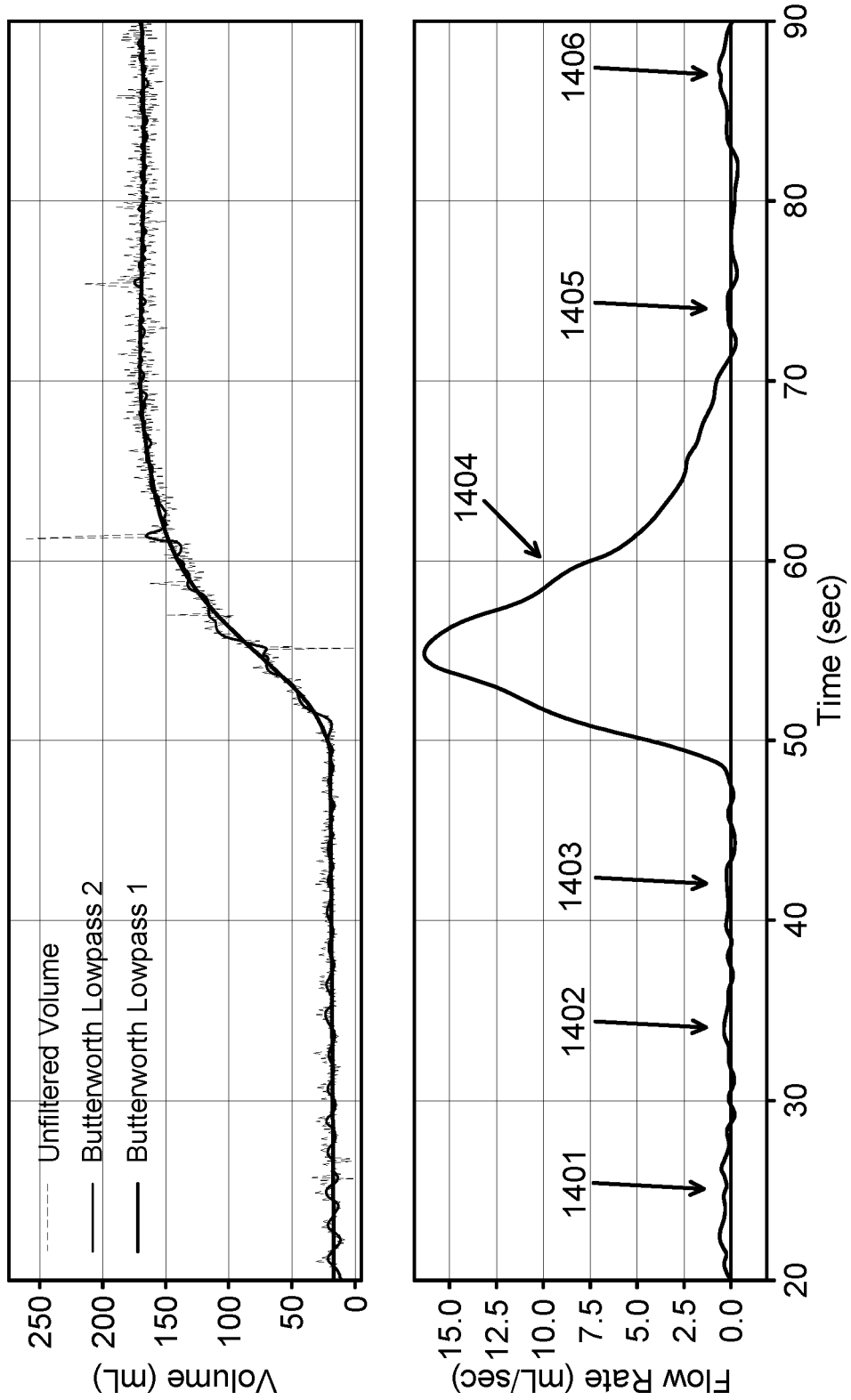
FIG. 14 is a graphical representation of volume and flow rate data measured in a toilet of the present disclosure.

Some information about the candidates is shown in FIG. 14 and is tabulated in Table 1 above; each candidate is listed on its own line in Table 1. FIG. 14 depicts excreta candidate selection. Both graphs have time in seconds (sec) along the x-axis and share the same range. The top graph has volume in mL along the y-axis and the lines depict unfiltered volume data, as well as data that has gone through Butterworth Lowpass 2 and 1 (filters 1 and 2 as described above). The bottom graph has flow rate in mL/sec on the y-axis, depicts a line representing the flow rate associated with the data, and has arrows pointing to excreta candidates (each candidate is represented on the table by its right-most digit, such as candidate "1401" on the figure becoming "1" on the table). The data is used by rejection rules to rule out unlikely candidates. In the table, "Duration" is simply the difference between the start time and the end time. The "Flow Rate Maximum" is the maximum flow rate between the "Start Time" and the "End Time". Calculation of the "Volume Delta" is a little more involved. It is the volume reading (top plot in FIG. 14) associated with start time of the next candidate less the volume reading associated with the start time of the current candidate. One reason for this approach is that when a rejection rule based on a volume threshold is applied, the rejection of false positives is improved. Another reason for this approach is that sometimes volume filter 1 overshoots the final volume after a rapid addition to the bowl; this approach compensates for that. "Flow Rate Average" is simply "Volume Delta" divided by "Duration".

Still referring to FIG. 14, application of a volume threshold rule rejection rule can narrow the list of excreta candidates to a single likely excreta event. With a volume threshold rule, if a candidate has a volume delta less than a certain threshold value, that candidate is rejected. Application of this rule with a threshold of about 15 mL leaves only one finalist, number 1404 and the corresponding number 4 on Table 1. Data from excreta deposits can be much more complex that this and such a filter may not produce such straight-forward results.

In one preferred embodiment, spurious changes and disturbances to bowl liquid level and volume occur when the toilet is flushed, when bowl level adjustments are made by the toilet itself, when the toilet shifts position, when there is an air pressure fluctuation either on the bowl or the sewer side of the flush water, etc. Additionally, the bowl shape may not be optimized for volume measurements. Preferably, multiple sources of information are used in sorting out true excreta events from false ones. A variety of signals from flush water and other sensors can be drawn from to assist with this. For example, one preferred embodiment has a lid position signal that is available. If the lid is down during a given time window, that data can be used to assume no excreta was added to the bowl during that time window. Any excretion event candidates that fall within that time window can therefore be rejected.

One preferred embodiment has the following set of rejection rules to help in determining if an excreta candidate is an excreta event. Adjustable thresholds help determine whether a given rule is applied to a dataset with an excreta candidate.

Rule 1: Based on the signal from the flush water sensor: Reject the candidate if the change in volume is below a specified threshold.

Rule 2: Based on the signal from the flush water sensor: Reject the candidate if the duration of the change in volume is shorter than a specified threshold. The results of implementing this rule often correlate with the results of implementing Rule 1.

Rule 3: Based on a signal indicating the lid position: Reject the candidate if the start time of the candidate occurs when the lid position indicates the lid is closed; the lid being closed implies that a user could not access the bowl to deposit excreta therein.

Rule 4: Based on a signal indicating whether the bidet is on: Reject the candidate if the start time of the candidate occurs after the first time the bidet has turned on (and prior to a flush cycle occurring to reset the flush water).

Rule 5: Based on a signal regarding the seat position and a weight measurement from the seat: Reject the candidate if the seat position indicates the seat is down but the weight on the seat is below a specified threshold. This has the potential to falsely reject excreta events where the user was hovering over the toilet rather than sitting. In an alternative embodiment, a signal from another sensor—such as an infrared sensor, an image sensors, or weight sensors which detect user weight applied on or near the toilet, but not on the seat—could be used to mitigate false rejections.

Rule 6: Based on a signal from the flush water sensor: Reject the candidate if the start time occurs after the flush water volume has exceeded a specified threshold. Measurements of flush water volume near the maximum volume capacity can be less reliable and the volume data is truncated above a specific threshold. Therefore, this rule filters out events for which the data could be less meaningful.

Some additional rules which can be implemented with other embodiments are shown below.

Additional Rule A: Based on a signal whether a sprayer, such as a bidet, has turned on: Reject candidate if the start time of the candidate is within a specified amount of time of a sprayer turning on. A sprayer adds volume to the flush water which can be falsely identified as an excreta event.

Additional Rule B: Based on data regarding start time of candidates: Reject the candidate if the start time is within hey specified amount of time of the previous candidate. One item to consider in conjunction with this rule is combining multiple Expedia candidates into one candidate. This may result in the loss of information.

Additional rule C: Based on the signal from a floor scale: Reject the candidate if the start time or end time occurs when the floor scale weight is below a specified threshold. Based on the design of the scale, it is possible to falsely reject excreta events if the user does not put their weight on the scale during the event.

One preferred embodiment, a test of event selection against 59 reference datasets with potential excreta candidate, 78 excreta events were detected and 6 of those were false positives. 7 recorded excreta events were not detected (false negatives). Such errors deserve close study to see if there are ways to improve excreta candidate classification. In one embodiment, sub-optimal toilet performance or data logging problems have contributed to creation of some of the errors.

Figure 15:
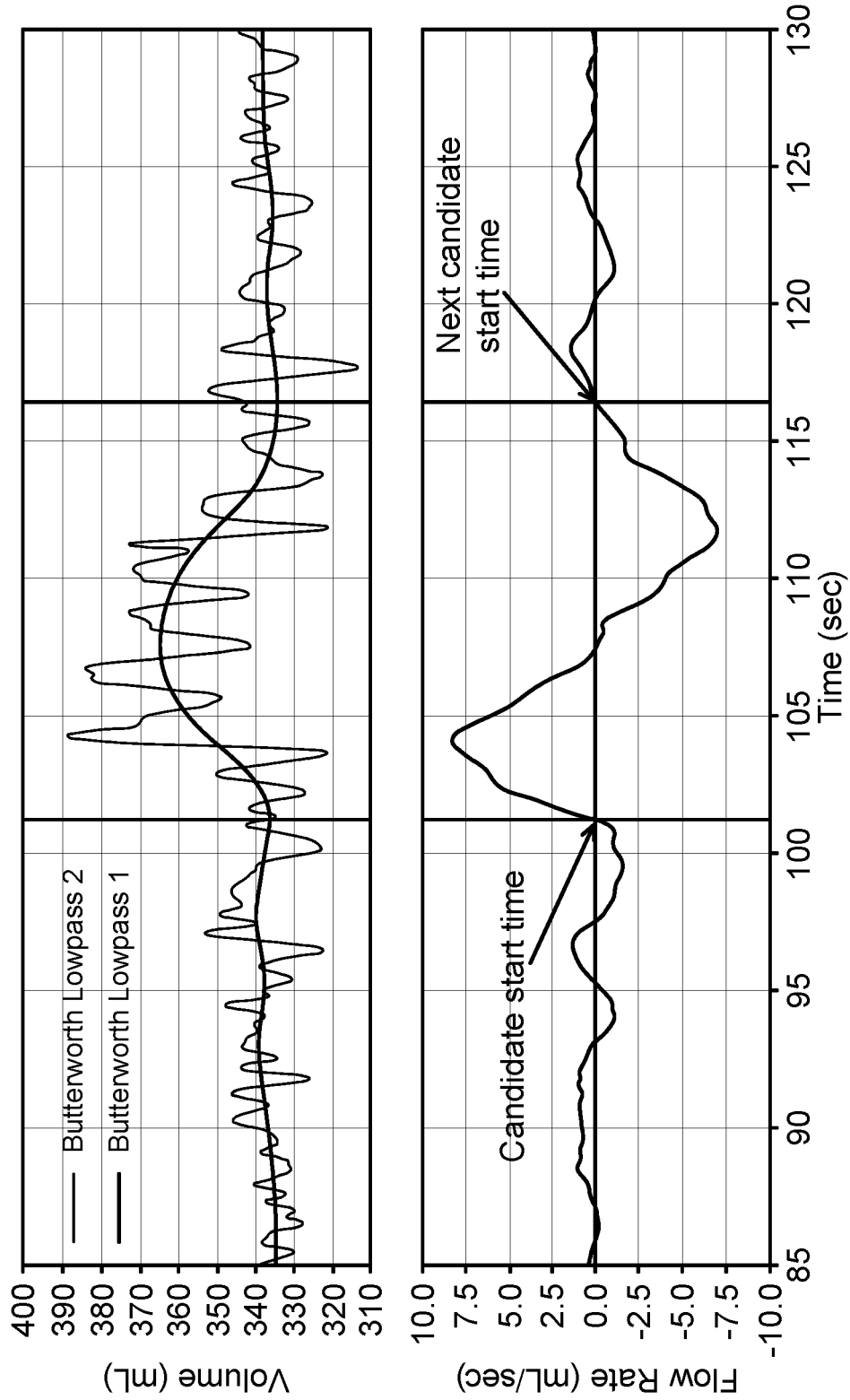
FIG. 15 is a graphical representation of volume and flow rate data measured in a toilet of the present disclosure.

As mentioned above, any time period from when the flow crosses to positive and when the flow crosses to negative is recognized as a candidate. The volume delta for the candidate must cross a threshold in order for a candidate to be recognized as an event. How the volume delta is determined has a big effect on the number of false positive events. With one preferred embodiment, if the volume delta is taken to be the difference in volume between the candidate start time and the negative flow crossing, then more false positives events are logged because temporary increases in volume are not accounted for. Such behavior may be due to the toilet shifting as a user shifts while sitting on the seat. For one potential example, see FIG. 15 in which the volume in the bowl is recorded as rising and then falling. In the figure, both graphs have time (sec) along the x-axis and share the same range. The top graph has volume (mL) along the y-axis and the lines show data from Butterworth Lowpass 2 and 1. The bottom graph has flow rate (mL/sec) along the y-axis, a line representing the flow rate from the data, and arrows pointing to consecutive candidate start times. In the example in FIG. 15, the excreta event candidate starting around 116 sec would be eliminated based on use of a minimum volume threshold. In one preferred embodiment and with true excreta events, the volume rises during the excreta event and then stays high. In this preferred embodiment, the candidate shown starting around 101 sec in FIG. 15 is therefore not a true excreta event. However, it would be categorized as an event if the volume threshold were set at 15 mL and the volume delta was determined to be the difference in volume between the candidate start time and the negative flow crossing.

The approach described above does not catch all false positives due to temporary increases in volume readings, especially those of long duration. Additional work with filters will likely improve classification accuracy.

Figure 16:
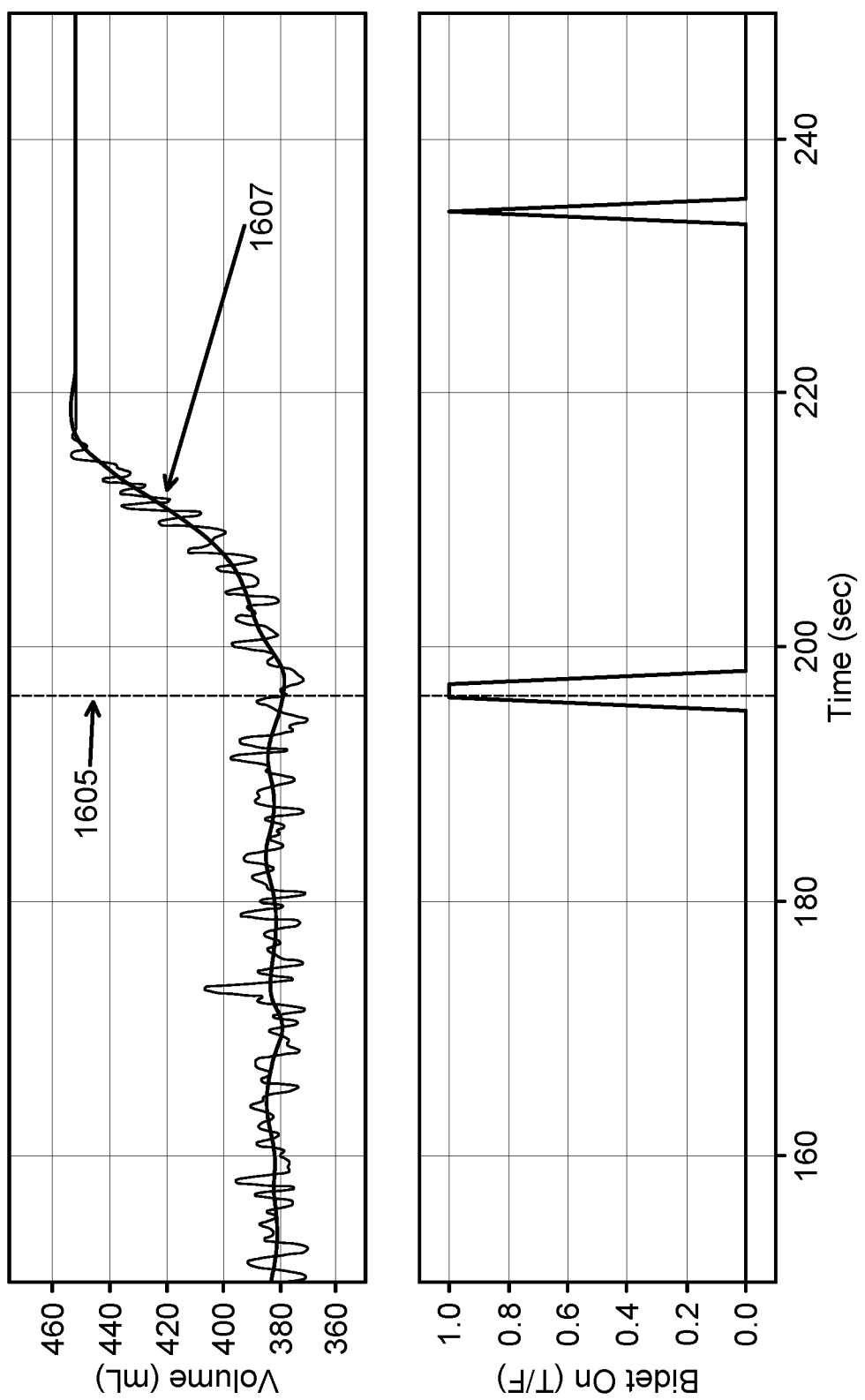
FIG. 16 is a graphical representation of volume and bidet status data measured in a toilet of the present disclosure.

In one preferred embodiment, there is a bidet and all event candidates that start after the bidet turns on are rejected. Additionally, this can be modified slightly so all event candidates that don't finish before the bidet is turned on are also rejected. FIG. 16 illustrates an application of this rule. Line 1605 signifies when the bidet turned on. Some, if not all, of the change in the volume data following the bidet being turned on can be attributed to the flush water collecting water from the bidet. Therefore, Excreta candidate 1607 is rejected based on the bidet having turned on prior to the formation of the candidate. Without the application of the bidet rule, this volume increase would be interpreted as a urination event. See Rule 4 above.

In one preferred embodiment, the volume of excreta added to the bowl that can be measured is limited. With one bowl design, the limit is between 450 to 500 mL. Near the upper limit, volume measurements are less reliable for a few reasons. First, as material is added, the liquid level rises. When the liquid level in the bowl reaches the overflow point of the P-trap, a meniscus can build. When the meniscus breaks and liquid flows into the sewer system, the liquid level drops by a small amount. This can all be observed in the volume data. When liquid reaches the overflow point and fluid flows into the sewer, subsequent volume measurements are less reliable. Second, when a proximity sensor is positioned below the top surface of the flush water and used to measure the flush water volume, the response can be less sensitive near the overflow point. Third, large, loose defecation might introduce turbidity that makes its way up the fill tube and interferes with some sensors, such as a proximity sensor. Such turbidity with a proximity sensor may increase the error associated with the volume readings. One set of alternative designs have a limit of approximately 1000 mL.

Figure 17:
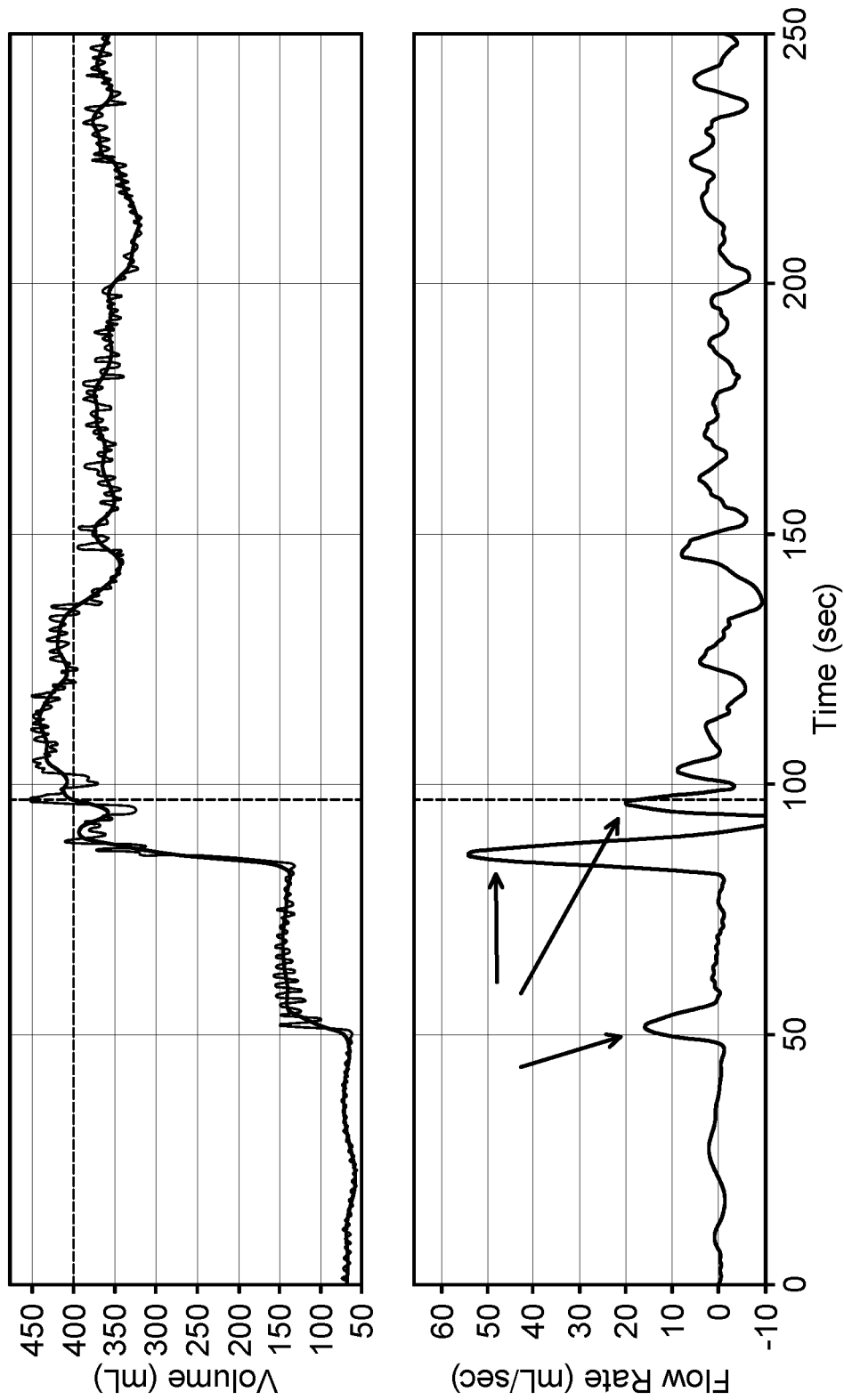
FIG. 17 is a graphical representation of volume and flow rate data measured in a toilet of the present disclosure.

For the reasons above, in one preferred embodiment, a rule exists that specifies that event candidates are rejected if they start after a particular volume threshold is reached; see Rule 6 above. FIG. 17 illustrates an example application of this rule. Both graphs have time (sec) along the x-axis and share the same range. The top graph has volume (mL) along the y-axis, has a horizontal line at 400 mL representing the volume threshold, and a vertical line at approximately 97 sec that depicts when the volume threshold was substantially crossed. Event candidates that begin before 97 sec are not rejected by this rule; arrows point to these candidates. Excreta candidates that begin after 97 sec are rejected. In this case the threshold of 400 mL is determined by subtracting the upper calibration limit (450 mL) minus 50 mL.

In one preferred embodiment, defecation can usually be distinguished from urination by the behavior of the liquid in the bowl. Defecation flow rates are almost always much higher than urination flow rates and the duration of a defecation event is usually much shorter than the duration of a urination event. The high flow rate and short duration of defecation often results in a high-amplitude resonant oscillation in the bowl as detected by the flush water sensor. The characteristics of this oscillation are likely influenced by the geometry of the bowl. In one preferred embodiment, the period of the oscillation is about 2 sec. This oscillation is apparent in the data from the flush water sensor. In one embodiment, urination does not produce this resonant oscillation. FIG. 13 is an illustration of the differences in bowl liquid behavior with urination and defecation with urination being below approximately 170 mL and defecation being above approximately 170 mL. In one preferred embodiment, the oscillations interfere with the ability to visualize the defecation flow profile and to measure the maximum defecation flow rate.

Figure 18:
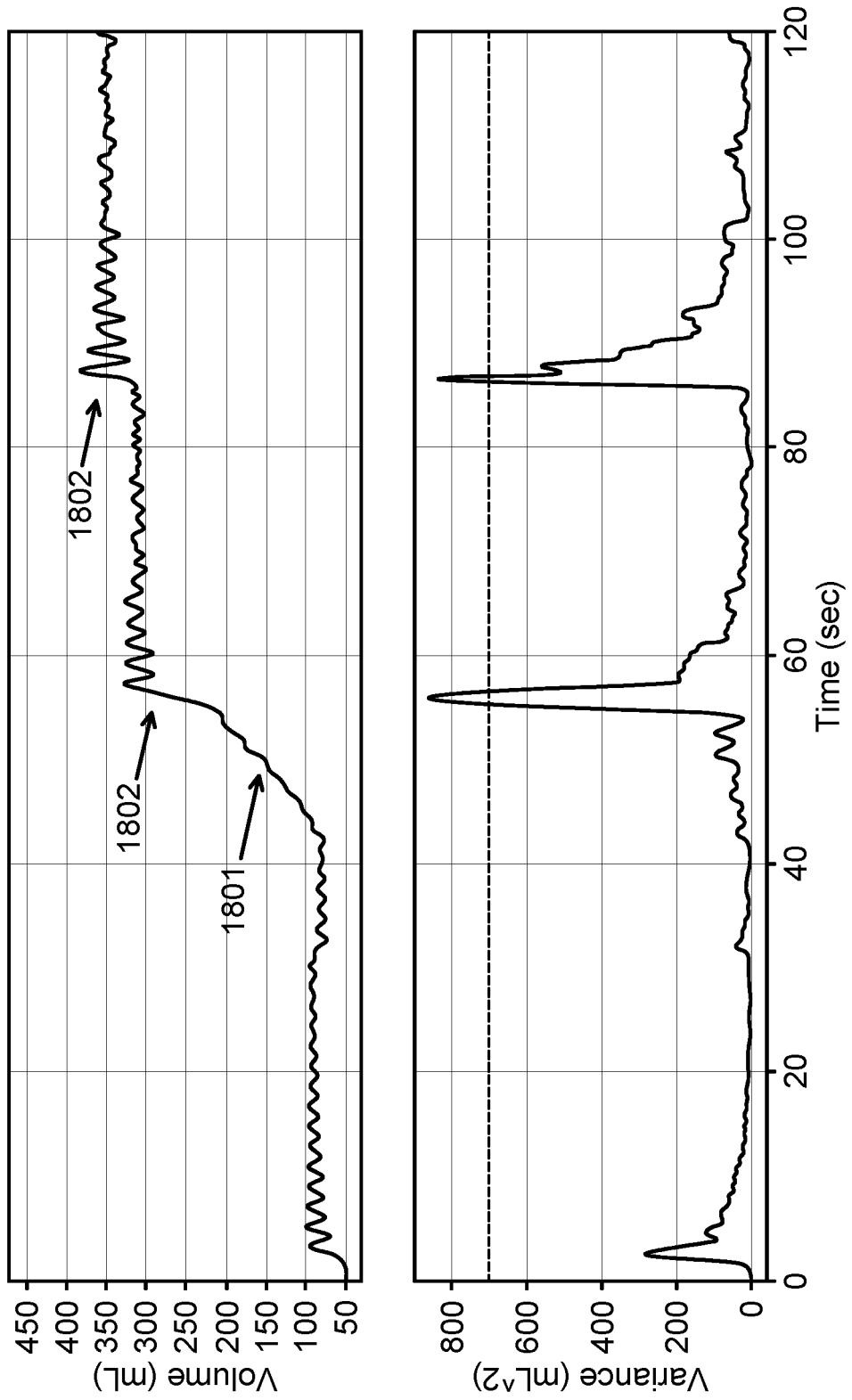
FIG. 18 is a graphical representation of volume and variance data measured in a toilet of the present disclosure.

The high flow rates and oscillation associated with defecation in one embodiment of the invention become quite visible in a moving variance window plot of bowl volume. The top plot in FIG. 18 shows an example of a volume trace for an excreta event in which defecation and urination occurred. Both graphs have an x-axis of time (sec) and share the same range. The top graph has a y-axis of volume (mL) and a line depicting volume change. The line has been classified with urination event 1801 and defecation events 1802. The bottom plot has a y-axis of variance (mL$^\wedge$2) and shows that moving window variance is dramatically different between urination and defecation. When the variance rises above the threshold indicated by the line at approximately 700 mL$^\wedge$2, information about the crossing is added to a 'defecation candidate' table. The 'defecation candidate' table is compared to the 'excreta event' table. When the start of a defecation candidate falls within an excreta event, the event is flagged in the 'excreta event' table as a defecation event.

Other embodiments of the invention have used other methods for defecation detection, but this embodiment classifies excreta events the more accurately. Through the application of this method against the reference data sets, it accurately classified 71 of 72 known excreta events as either defecation or urination—the one misclassification was for an event that was reported to be defecation, but a separate assessment of the data determined the event to be urination. Additional testing may determine that there is another, more preferred defecation detection method. For example, the results of the described method may not be as preferred when the set of reference data includes data sets from a broader array of toilet users.

In one preferred embodiment, data from an excreta event can be used to determine and/or report numerous metrics, including voided volume, maximum flow rate, average flow rate, flow time, voiding time, time to maximum flow, and number of intermittent void events.

In one preferred embodiment, when urination and defecation happen in the same session and at the same time, the volume contribution of urine is not separated from the volume contribution of feces. Various other data processing and/or additional sensors can be implemented to provide this separation.

This procedure will underestimate the defecation event start time by a few seconds. One way around this is to improve the volume filters.

All patents, published patent applications, and other publications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A toilet adapted to measure the amount of excreta received comprising:
   a bowl adapted to receive excreta;
   a volume of flush water into which the excreta is received after being received by the bowl;

a pressure sensor configured to monitor the pressure exerted by the flush water and any excreta therein; and a flush water volume regulator for regulating the amount of flush water;

wherein the flush water volume regulator receives data from the pressure sensor to determine the volume of flush water present in the toilet and adjusts the amount of flush water in the toilet to a preferred volume;

wherein data from monitoring the pressure of the flush water is used to determine the weight or volume of the excreta received by the bowl.

2. The toilet of claim 1, wherein the pressure sensor is in contact with the flush water.

3. The toilet of claim 1, wherein the pressure sensor is separated from the flush water by a waterproof barrier that allows the sensor to monitor the property of the flush water.

4. The toilet of claim 1, wherein the pressure sensor is a pressure transducer.

5. The toilet of claim 1, wherein the pressure sensor is on a wall which contains the flush water within the toilet.

6. The toilet of claim 1, wherein the pressure sensor is located at least partially below the top surface of the flush water.

7. The toilet of claim 1, wherein the pressure sensor is located in a chamber and the pressure in the chamber is affected by the pressure exerted by the flush water.

8. The toilet of claim 1, wherein the excreta is primarily urine.

9. The toilet of claim 1, wherein data about the volume of the excreta is used to determine the volume of one type of excreta when more than one type of excreta is received by the toilet.

10. The toilet of claim 1, wherein data about the volume of the excreta is used to determine part of a urination profile.

11. The toilet of claim 1, wherein the flush water volume regulator comprises a valve that opens and closes a fluid connection to the flush water.

12. The toilet of claim 1, wherein the flush water volume regulator selectively adds water to the flush water.

13. The toilet of claim 1, wherein the flush water volume regulator selectively removes a portion of the flush water.

14. A toilet adapted to measure the amount of excreta received comprising:
a bowl adapted to receive excreta;
a volume of flush water into which the excreta is received after being received by the bowl; and
a pressure sensor configured to monitor the pressure exerted by the flush water and any excreta therein;
wherein data from monitoring the pressure of the flush water is used to determine if the volume of flush water matches a preferred amount of flush water and the volume of flush water is adjusted toward the preferred amount if it is not; and
wherein data from monitoring the pressure of the flush water is used to determine the weight or volume of the excreta received by the bowl.

15. A method for determining a urine characteristic from an excreta event comprising:
providing a toilet comprising:
a bowl adapted to receive excreta;
a volume of flush water into which the excreta is received after being received by the bowl;
a pressure sensor configured to monitor the pressure exerted by the flush water and any excreta therein; and
a flush water volume regulator for regulating the amount of flush water;
wherein the flush water volume regulator receives data from the pressure sensor to determine the volume of flush water present in the toilet and adjusts the amount of flush water in the toilet to a preferred volume;
monitoring the volume of flush water during a time period that overlaps an excreta event;
analyzing how the volume of the flush water changes as a result of excreta being deposited into the bowl;
identifying a volume change feature of the data from the monitoring that correspond with a urination event; and
using the volume change feature that corresponds with a urination event to determine a urine characteristic from the excreta event.

16. The method of claim 15, wherein the urine characteristic comprises a urine flow rate.

17. The method of claim 15, wherein the urine characteristic comprises an amount of urine deposited into the toilet during the period of time associated with the volume change feature.

18. The method of claim 15, further comprising a second volume change feature that correspond with a urination event and wherein the second volume change feature is also used to determine the urine characteristic from the excreta event.

* * * * *